(12) United States Patent
Avellone et al.

(10) Patent No.: US 7,949,038 B2
(45) Date of Patent: May 24, 2011

(54) METHOD AND SYSTEM FOR RESOLVING THE ACQUISITION AMBIGUITY AND THE PROBLEM OF FALSE LOCK IN TRACKING BOC(M,N) MODULATED SIGNALS, PARTICULARLY FOR SATELLITE POSITIONING/NAVIGATION SYSTEMS

(75) Inventors: Giuseppe Avellone, Gravina di Catania (IT); Maristella Frazzetto, Catania (IT); Ettore Messina, Palermo (IT)

(73) Assignee: STMicroelectronics, S.r.l., Agrate Brianza (IT)

(*) Notice: Subject to any disclaimer, the term of this patent is extended or adjusted under 35 U.S.C. 154(b) by 764 days.

(21) Appl. No.: 12/001,992

(22) Filed: Dec. 12, 2007

(65) Prior Publication Data
US 2009/0046766 A1 Feb. 19, 2009

(30) Foreign Application Priority Data

Dec. 12, 2006 (EP) .................................... 06425828

(51) Int. Cl.
*H04B 1/00* (2006.01)
(52) U.S. Cl. ........ 375/150; 375/130; 375/136; 375/142; 375/143; 375/316; 375/340; 375/343; 375/354; 375/355; 370/315; 455/98; 342/352
(58) Field of Classification Search .................. 375/136, 375/142, 143, 150, 316, 343, 355, 130, 147, 375/340, 354; 370/315; 455/98; 342/352
See application file for complete search history.

(56) References Cited

U.S. PATENT DOCUMENTS

| | | | |
|---|---|---|---|
| 7,486,717 B2 * | 2/2009 | De Wilde et al. ............. | 375/150 |
| 7,555,033 B2 * | 6/2009 | Lillo et al. ................... | 375/150 |
| 2005/0270997 A1 | 12/2005 | Julien et al. | |
| 2006/0285581 A1 * | 12/2006 | Mattos .......................... | 375/150 |
| 2007/0274374 A1 * | 11/2007 | Abraham ...................... | 375/148 |
| 2008/0069187 A1 * | 3/2008 | Chen et al. ................... | 375/148 |

FOREIGN PATENT DOCUMENTS

EP 1 681 773 A 7/2006

OTHER PUBLICATIONS

Julien, O., M.E. Cannon, G. Lachapelle, C. Mongredien, and C. Macabiau (2004) "A New Unambiguous BOC(n,n) Signal Tracking Technique." CD-ROM Proceedings of GNSS 2004 Conference, Rotterdam, Netherlands (May 16-19, 2004), 12 pages. http://plan.geomatics.ucalgary.ca/papers/04gnssrotterdamojulien.pdf.
European Patent Office, European Search Report, Application No. EP 06 42 5828, Apr. 13, 2007.
Fante, R.L., "Unambiguous Tracker for GPS Binary-Offset-Carrier Signals," ION Annual Meeting, Jun. 23, 2003, pp. 141-145, XP002338821.

* cited by examiner

*Primary Examiner* — Leon Flores
(74) *Attorney, Agent, or Firm* — Lisa K. Jorgenson; Kevin D. Jablonski; Graybeal Jackson LLP

(57) ABSTRACT

A method and a system for the acquisition and tracking of BOC(m,n) modulated codes, m/n equal to an integer, in which a correlation function is calculated of the BOC(m,n) modulated code received from a remote transmitter with a code $w_a$ locally generated at a receiver terminal according to one from the following the relationships:

$$w_a(\tau)=c(\tau_n)-a \cdot [prn(\tau_n+T_c/2)-prn(\tau_n-T_c/2)]$$

$$w_a(\tau)=c(\tau_n)-a \cdot [prn(\tau_n+nT_c/2m)-prn(\tau_n-nT_c/2m)]$$

$$w_a(\tau)=c(\tau_n)-a \cdot [prn(\tau_n+nT_c/4m)+prn(\tau_n-nT_c/4m)]$$

$$w_a(\tau)=c(\tau_n)-a \cdot [prn(\tau_n+3nT_c/4m)+prn(\tau_n-3nT_c/4m)]$$

$$w(\tau)=[prn(\tau_n+nT_c/4m)+prn(\tau_n-nT_c/4m)]$$

$$w(\tau)=[prn(\tau_n+nT_c/2m)-prn(\tau_n-nT_c/2m)]$$

wherein $c(\tau)$ is a local replica of the BOC modulated pseudo-random noise code with delay $\tau_n$, $PRN(\tau)$ is a replica of the unmodulated pseudo-random noise code, and a is a predetermined weight coefficient, and
the correlation function being at the base of an acquisition test function whereby a code acquisition is recognized for a value of the test function being higher than a predetermined threshold.

24 Claims, 16 Drawing Sheets

METHOD AND SYSTEM FOR RESOLVING THE ACQUISITION AMBIGUITY AND THE PROBLEM OF FALSE LOCK IN TRACKING BOC(M,N) MODULATED SIGNALS, PARTICULARLY FOR SATELLITE POSITIONING/NAVIGATION SYSTEMS

PRIORITY CLAIM

This application claims priority from European patent application No. 06425828.8, filed Dec. 12, 2006, which is incorporated herein by reference.

TECHNICAL FIELD

Embodiments of the present invention generally relate to the acquisition and tracking of Binary Offset Carrier (BOC) modulated signals, and particularly to a method and system for the acquisition and tracking of codes, which can be applied in a receiver of a satellite positioning/navigation system.

BACKGROUND

To be capable of receiving and decoding the information from a satellite in a satellite positioning/navigation system, a receiver is required to carry out an acquisition process to recognize the signal in the space and correctly identify the presence of the satellite from which this signal has been received, the latter being typically affected by unspecified delay and Doppler shift.

Specifically, the acquisition and tracking system (fine acquisition) of a receiver is required to recognize the correct acquisition of a signal by carrying out comparison (correlation) operations between the input signal and a set of codes (pseudo-random sequences) that belong to the various satellites in the constellation and are locally generated by the receiver, which operations are carried out in a research domain being defined by the variables: code delay and Doppler shift.

The acquisition process generally implies calculating the correlation between the received signal and a local replica of the code available at the receiver, and an acquisition is declared when the value of a variable or test function such as a predetermined correlation function, such as the correlation energy, is higher than a preset threshold.

The performance of the acquisition strategy is traditionally assessed in terms of acquisition time, detection probability and false alarm probability and depends, inter alia, on the carrier signal-to-noise ratio $C/N_0$.

BOC modulated signals are candidates for use in the next generation satellite navigation systems, particularly the GPS system updated edition and the innovative GALILEO system. They have reduced multiple-path distortion and potentially improved code tracking characteristics.

Disadvantageously, a BOC modulated signal has a multiple peak autocorrelation function. Due to the presence of secondary peaks, several problems arise both during the acquisition step and tracking step of codes, when prior art receivers are used, which recognize an acquisition on the basis of a threshold comparison of the signal autocorrelation function. In fact, a lock on secondary peaks is possible with non-null probability (acquisition ambiguity) and the lock on a secondary peak cannot be resolved during the tracking step.

Solutions are known in the literature, most of which are effective in ambiguity mitigation for sine BOC modulated signals, but less effective if applied to cosine BOC modulated signals.

For example, a tracking discriminator of the traditional Early Minus Late (EML) type being applied to a BOC(1,1)-modulated pseudo-random noise code and with an interval between the early replica and late replica (Early-Late interval) lower than chip time $T_c$ has a discriminator curve (curve S) with three stable lock points, the desired one being at the x-axis point 0 and two further points at $\pm 0.55 T_c$, respectively, and the latter can introduce unacceptable pseudorange errors, in the order of tens of meters.

In order to limit this problem, new acquisition and tracking algorithms have been proposed in the art, which, however, require more complex receivers.

Most of these algorithms tend to attenuate the secondary peaks of the autocorrelation function by combining, in the definition of the above-mentioned test function, the correlation function between the received signal and the local replica of the BOC modulated signal, with the correlation functions between the received signal and suitably selected auxiliary signals or waveforms. One of these waveforms is the unmodulated pseudo-random noise signal (PRN). The cross correlation function of the unmodulated pseudo-random noise signal with a BOC modulated signal has peaks proximate to the secondary peaks of the autocorrelation function of the BOC modulated signal and a lower value for perfect alignment.

One solution proposed in the literature for reducing the ambiguity, provides for carrying out a cross correlation with the relative locally generated unmodulated pseudo-random noise code.

When the cross correlation function between the received signal and the unmodulated pseudo-random noise code is combined with the autocorrelation function of the BOC modulated signal, the following test variable is defined $$U = |x_{BOC}(n)|^2 - |x_{BOC/PRN}(n)|^2$$

wherein $x_{BOC}(n)$ is the autocorrelation function of the BOC modulated signal and $x_{BOC/PRN}(n)$ is the cross correlation function between the BOC modulated signal and the pseudo-random noise code.

As the BOC/PRN cross correlation function has peaks proximate to the secondary peaks of the BOC autocorrelation function and results to be of a nearly null value at the main peak of the autocorrelation function, this test variable allows for a good separation between the main peak and the secondary peaks, thus lowering the acquisition ambiguity and eliminating the stable lock points of the Early-Minus-Late (EML) discriminator approach that are arranged at $T_c/2$ distance from the actual lock point.

Disadvantageously, this approach requires that the operations required for calculating the tracking discriminator functions and for evaluating the BOC/PRN cross correlation function are doubled.

On the other hand, as relates to the code tracking step, the traditional approaches for consumer products are based on Early-Minus-Late algorithms or DOT algorithms.

However, it should be considered that Early-Minus-Late approaches are not capable of recovering the ideal stable lock point from a secondary lock point.

An example of this situation is illustrated in FIG. 1, where a curve S is depicted of a DOT discriminator for a sine BOC(1,1) modulated code and Early-Late interval of $0.4 T_c$. The correct lock point is the one in the middle, which is indicated at 0 on the X-axis, whereas the false lock points are the two lateral points, at $-0.6 T_c$ and $+0.6 T_c$ on the x-axis, respectively.

Also in these cases, several solutions have been proposed in the literature, such as the "Very Early-Very Late" or "Bump-Jumping" schemes. In this case, however, a second pair of correlators is required to be used with an interval equal to or greater than $0.5T_c$, and it is required to check whether the indication lies on the correct peak or a secondary peak. The discriminator can either directly incorporate the difference of the correlator outputs or compare the correlation energy according to the EML method with that obtained according to the VEMVL method for deciding the correct tracking pitch to be forwarded to the Numerical Control Oscillator for subsequent time-adjustment.

Another approach describes a tracking scheme in which the product of the EML approach obtained using the autocorrelation function of the BOC modulated signal is combined with the product of the EML approach obtained using the cross correlation function between the BOC modulated signal and the pseudo-random noise signal, with a preset scaling factor. The curve S obtainable according to the latter approach does not have secondary stable points, but the operation range thereof is not greater than $0.4T_c$.

However, increasing the operative range is desired, as major delays can be made up while the acquisition system is simultaneously allowed to consider a research time grid with a wider spacing (for example, instead of carrying out the test with the distance between subsequent delays amounting to $T_c/4$, a spacing of $T_c/2$ (or, at the most, $T_c$) can be used, thus reducing the calculations and time used for the signal acquisition and the initial (loose) estimate of the delay.

A further problem to be addressed is that the tracking performance of a receiver in a satellite positioning system results are severely degraded when the signal received is affected by a multiple path propagation. In this case, the discriminator curve S in the code tracking changes its shape while crossing the x-axis no longer at the origin, and thus introducing a polarization in the pseudorange measurements, thereby increasing the uncertainty in the position estimate.

Solutions have been introduced for ensuring a better rejection of multiple paths with GPS system signal, but their effectiveness still has to be proved for BOC modulated signals used in the future GALILEO positioning/navigation system.

SUMMARY

According to an embodiment of the present invention, a method and system for the acquisition and tracking of BOC modulated codes (both sine and cosine based) with reduced acquisition ambiguity is provided which does not have false lock stable points in the discriminator curve S, thereby allowing a tracking operation range having $T_c$ amplitude (i.e. in the range $[-T_c/2, +T_c/2]$) and which improves the ability of multiple path rejection in code tracking.

According to a first embodiment of the present invention, these a method for the acquisition and tracking of BOC(n,n) modulated codes, particularly for satellite positioning/navigation systems includes the steps of:

acquiring at a receiver terminal a BOC(n,n) modulated pseudo-random noise code, from a remote transmitter;
generating a local replica of said pseudo-random noise code at the receiver terminal; and
calculating a correlation function of the BOC(n,n) modulated code received with a code $w_a$ locally generated according to the relationship $$w_a(\tau) = c(\tau_n) - a \cdot [prn(\tau_n + T_c/2) - prn(\tau_n - T_c/2)]$$

wherein $c(\tau)$ is a local replica of said BOC modulated pseudo-random noise code with delay $\tau_n$, $prn(\tau)$ is a replica of said unmodulated pseudo-random noise code, and a is a predetermined weight coefficient, said correlation function being at the base of an acquisition test function, whereby a code acquisition is recognized for a value of said test function being higher than a predetermined threshold.

According to another embodiment of the present invention a system for acquisition and tracking BOC(n,n) modulated codes, includes:

means for acquiring a BOC(n,n) modulated pseudo-random noise code from a remote transmitter;
means for generating a replica locale of said pseudo-random noise code, and
processing means arranged for calculating an acquisition test function based on the BOC(n,n) modulated code received and a local replica relative to said signal,
wherein said processing means are arranged for calculating a correlation function of the BOC(n,n) modulated pseudo-random noise code received with a $w_a$ code locally generated according to the relationship $$w_a(\tau) = c(\tau_n) - a \cdot [prn(\tau_n + T_c/2) - prn(\tau_n - T_c/2)]$$

wherein $c(\tau)$ is a local replica of said BOC modulated pseudo-random noise code with delay $\tau_n$, $prn(\tau)$ is a replica of said unmodulated pseudo-random noise code, and a is a predetermined weight coefficient.

According to a second embodiment of the present invention, a method for the acquisition and tracking of BOC(m,n) modulated codes, m/n equal to an integer, particularly for satellite positioning/navigation systems, includes the steps of:

acquiring at a receiver terminal a BOC(m,n) modulated pseudo-random noise code, from a remote transmitter;
generating a local replica of said pseudo-random noise code at the receiver terminal; and
calculating a correlation function of the BOC(m,n) modulated code received with a code $w_a$ locally generated according to the relationship $$w_a(\tau) = c(\tau_n) - a \cdot [prn(\tau_n + nT_c/2m) - prn(\tau_n - nT_c/2m)]$$

wherein $c(\tau)$ is a local replica of said BOC modulated pseudo-random noise code with delay $\tau_n$, $prn(\tau)$ is a replica of said unmodulated pseudo-random noise code, and a is a predetermined weight coefficient, said correlation function being at the base of an acquisition test function, whereby a code acquisition is recognized for a value of said test function being higher than a predetermined threshold, and by a system implementing the method.

According to a third embodiment of the present invention, a method for the acquisition and tracking of BOC(m,n) modulated codes, m/n equal to an integer, particularly for satellite positioning/navigation systems, includes the steps of:

acquiring at a receiver terminal a BOC(m,n) modulated pseudo-random noise code, from a remote transmitter;
generating a local replica of said pseudo-random noise code at the receiver terminal; and
calculating a correlation function of the BOC(m,n) modulated code received with a code $w_a$ locally generated according to the relationship $$w_a(\tau) = c(\tau_n) - a \cdot [prn(\tau_n + nT_c/4m) + prn(\tau_n - nT_c/4m)]$$

wherein $c(\tau)$ is a local replica of said BOC modulated pseudo-random noise code with delay $\tau_n$, $prn(\tau)$ is a replica of said unmodulated pseudo-random noise code, and a is a predetermined weight coefficient, said correlation function being at the base of an acquisition test function, whereby a code acquisition is recognized for a value of said test function being higher than a predetermined threshold, and by a system implementing the method.

According to a fourth embodiment of the present invention, a method for the acquisition and tracking of BOC(m,n) modulated codes, m/n equal to an integer, particularly for satellite positioning/navigation systems, includes the steps of:
- acquiring at a receiver terminal a BOC(m,n) modulated pseudo-random noise code, from a remote transmitter;
- generating a local replica of said pseudo-random noise code at the receiver terminal; and
- calculating a correlation function of the BOC(m,n) modulated code received with a code $w_a$ locally generated according to the relationship $$w_a(\tau) = c(\tau_n) - a \cdot [prn(\tau_n + 3nT_c/4m) + prn(\tau_n - 3nT_c/4m)]$$

wherein $c(\tau)$ is a local replica of said BOC modulated pseudo-random noise code with delay $\tau_n$, $prn(\tau)$ is a replica of said unmodulated pseudo-random noise code, and a is a predetermined weight coefficient, said correlation function being at the base of an acquisition test function, whereby a code acquisition is recognized for a value of said test function being higher than a predetermined threshold, and by a system implementing the method.

According to a fifth embodiment of the present invention, a method for the acquisition and tracking of BOC(m,n) modulated codes, m/n equal to an integer, particularly for satellite positioning/navigation systems, includes the steps of:
- acquiring at a receiver terminal a BOC(m,n) modulated pseudo-random noise code, from a remote transmitter;
- generating a local replica of said pseudo-random noise code at the receiver terminal; and
- calculating a correlation function of the BOC(m,n) modulated code received with a code w locally generated according to the relationship $$w(\tau) = [prn(\tau_n + nT_c/4m) + prn(\tau_n - nT_c/4m)]$$

wherein $prn(\tau)$ is a replica of said unmodulated pseudo-random noise code, said correlation function being at the base of an acquisition test function, whereby a code acquisition is recognized for a value of said test function being higher than a predetermined threshold, and by a system implementing the method.

According to a sixth embodiment of the present invention, these a method for the acquisition and tracking of BOC(m,n) modulated codes, m/n equal to an integer, particularly for satellite positioning/navigation systems, includes the steps of:
- acquiring at a receiver terminal a BOC(m,n) modulated pseudo-random noise code, from a remote transmitter;
- generating a local replica of said pseudo-random noise code at the receiver terminal; and
- calculating a correlation function of the BOC(m,n) modulated code received with a code w locally generated according to the relationship $$w(\tau) = [prn(\tau_n + nT_c/2m) - prn(\tau_n - nT_c/2m)]$$

wherein $prn(\tau)$ is a replica of said unmodulated pseudo-random noise code, said correlation function being at the base of an acquisition test function, whereby a code acquisition is recognized for a value of said test function being higher than a predetermined threshold, and by a system implementing the method.

Embodiments of the invention may be contained in a receiver of a satellite positioning/navigation system for the acquisition and tracking of codes in such a system.

BRIEF DESCRIPTION OF THE DRAWINGS

Further characteristics and advantages of the invention will be better discussed in the description below, which is given by way of non-limiting example, with reference to the annexed drawings, in which.

DETAILED DESCRIPTION

Figure 1:
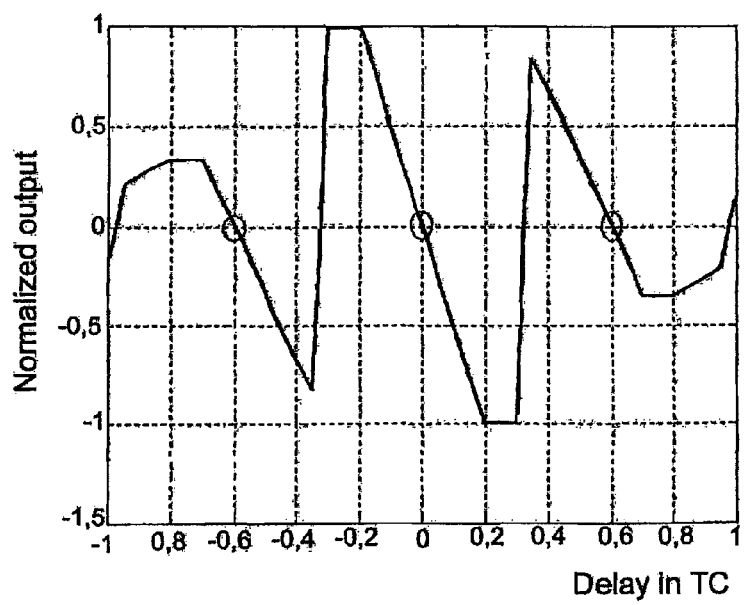
FIG. 1 is a diagram representing a discriminator curve S for a prior art acquisition and tracking system.

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of the invention will be first described herein below by considering the acquisition of the BOC(1,1) modulated pilot channel (pseudo-random noise code C) of the GALILEO L1 signal, which is used for free positioning and navigation services. The GALILEO L1 signal consists of three components, which are multiplexed by applying a Coherent Adaptive Sub-Carrier Modulation (CASM). However, the application of embodiments the present invention should not be considered as being limited to positioning and navigation systems (among which there is also the upgrade of the known GPS system), but can be applied to any other radio communication system using BOC(m,n) modulated codes.

Embodiments of the invention are based on an approach of resolving the acquisition ambiguity using cross correlation functions, and to the purpose it defines novel families of waveforms to be adopted in the calculation of cross correlation functions with a BOC modulated signal received from a satellite, and a novel acquisition test function for obtaining a resolution of the acquisition ambiguity and problem of false lock of the tracking point, without increasing either the number of correlators or the calculations by a receiver device in a positioning terminal.

According to a first embodiment of the invention regarding BOC(n,n) modulated signals, a family of signals (codes) is locally generated at the receiver, which is to be used both during the acquisition step and in a traditional EML tracking discriminator function, which has a waveform as follows:

$$w_a(\tau) = c(\tau_n) - a \cdot [prn(\tau_n + T_c/2) - prn(\tau_n - T_c/2)]$$

wherein $c(\tau)$ is the BOC modulated pseudo-random noise code with delay $\tau_n$, $prn(\tau)$ is the unmodulated pseudo-random noise code, and a is a predeterminable weight coefficient.

This signal family is used in calculating an acquisition test function for correlation with the BOC modulated signal received, of the formula:

$$|x_{BOC}(n) - a \cdot (x_{BOC/PRN}(n+1) - x_{BOC/PRN}(n-1))|^2$$

the notation $x(n-1)$, $x(n+1)$ designating the correlation between the BOC modulated signal received and the local unmodulated early, respectively late, replica.

The correlation technique using the above waveform family can be referred to as a "filtered" correlation technique by analogy with the output of a three-point FIR filter (for example, when a=0.5 is selected, the "connection points" of the filter will be $-\frac{1}{2}$, 1, $+\frac{1}{2}$).

According to a second embodiment of the invention especially regarding sine BOC(m,n) modulated signals, with m/n ratio equal to an integer, a family of signals (codes) is locally generated at the receiver, which is to be used both during the acquisition step and in a traditional EML tracking discriminator function, which has a waveform as follows:

$$w(\tau) = c(\tau_n) - a \cdot [prn(\tau_n + nT_c/2m) + prn(\tau_n - nT_c/2m)]$$

wherein $c(\tau)$ is the BOC modulated pseudo-random noise code with delay $\tau_n$, $prn(\tau)$ is the unmodulated pseudo-random noise code, and a is a predeterminable weight coefficient.

According to a third embodiment of the invention especially regarding cosine BOC(m,n) modulated signals, with m/n ratio equal to an integer, a family of signals (codes) is locally generated at the receiver, which is to be used particularly during the acquisition step, which has a waveform as follows:

$$w(\tau) = c(\tau_n) - a \cdot [prn(\tau_n + nT_c/4m) + prn(\tau_n - nT_c/4m)]$$

wherein $c(\tau)$ is the BOC modulated pseudo-random noise code with delay $\tau_n$, $prn(\tau)$ is the unmodulated pseudo-random noise code, and a is a predeterminable weight coefficient.

According to a fourth embodiment of the invention especially regarding cosine BOC(n,n) modulated signals, a family of signals (codes) is locally generated at the receiver, which is to be used particularly in a traditional DOT tracking stage, which has a waveform as follows:

$$w(\tau) = c(\tau_n) - a \cdot [prn(\tau_n + 3nT_c/4m) + prn(\tau_n - 3nT_c/4m)]$$

wherein $c(\tau)$ is the BOC modulated pseudo-random noise code with delay $\tau_n$, $prn(\tau)$ is the unmodulated pseudo-random noise code, and a is a predeterminable weight coefficient.

According to a fifth embodiment of the invention especially regarding cosine BOC(n,n) modulated signals, a family of signals (codes) is locally generated at the receiver, which is to be used particularly in a code tracking scheme, which has a waveform as follows:

$$w(\tau) = [prn(\tau_n + nT_c/4m) + prn(\tau_n - nT_c/4m)]$$

wherein $prn(\tau)$ is the unmodulated pseudo-random noise code.

According to a sixth embodiment of the invention especially regarding sine BOC(m,n) modulated signals, with m/n ratio equal to an integer, a family of signals (codes) is locally generated at the receiver, which is to be used particularly in a tracking stage, which has a waveform as follows:

$$w(\tau) = [prn(\tau_n + nT_c/2m) + prn(\tau_n - nT_c/2m)]$$

wherein $prn(\tau)$ is the unmodulated pseudo-random noise code.

These signal families are used in calculating an acquisition test function for correlation with the BOC modulated signal received. The correlation technique using the above waveform families can still be referred to as a "filtered" correlation technique by analogy with the output of a three-point FIR filter.

While most of the prior art solutions tries to decrease the secondary peaks, the inventive approach is aimed to enhance the separation between the main peak and the secondary ones.

The generation of the above waveforms can be easily attributed to a hardware system that can be integrated in an acquisition and/or tracking module of a receiver. This advantageously allows using the same correlator structure adopted for GPS signals thus simplifying the project of a possible "dual-mode" receiver (GPS-GALILEO).

Figure 2:
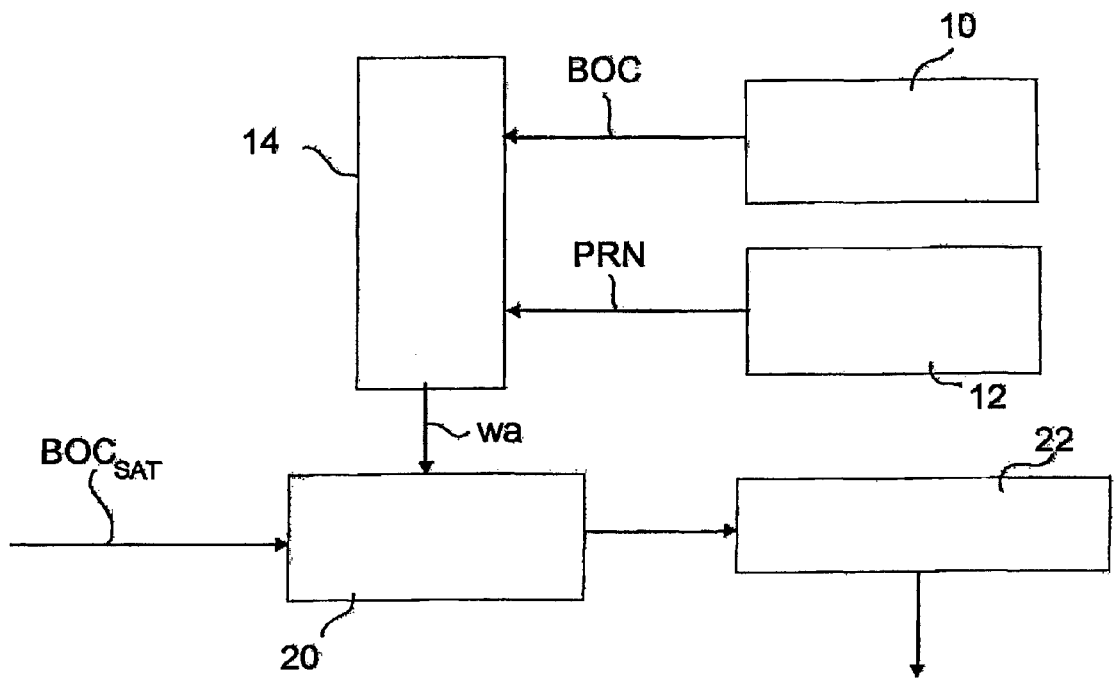
FIG. 2 is a block diagram of a first embodiment of an acquisition stage of a system according to an embodiment of the invention.

In FIG. 2 a block diagram of the acquisition stage of a BOC modulated signal in a receiver is illustrated according to the principles of embodiments of the present invention.

With 10 is designated a BOC modulated pseudo-random noise signal (code) generator (the parameters n of the BOC modulation being determined in advance) and with 12 an unmodulated pseudo-random noise signal (code) generator. The generators 10 and 12 are arranged to generate a BOC modulated pseudo-random noise local code and the same unmodulated pseudo-random noise code, designated with BOC and PRN, respectively, which are provided to a combinatory module 14 suitable to carry out the combination of said codes with a predetermined weight in order to obtain a local code $w_a$ of the waveform family discussed above.

The local code $w_a$ is then provided to a correlator or adapted filter 20 suitable to receive the BOC modulated signal, designated with con $BOC_{SAT}$ at a second input thereof.

The correlator 20 is suitable for calculating the cross correlation between the $BOC_{SAT}$ and $w_a$ signals received at the inputs thereof, and for sending the result to a subsequent processing module 22 of the acquisition stage, which operates according to known techniques.

Figure 3:
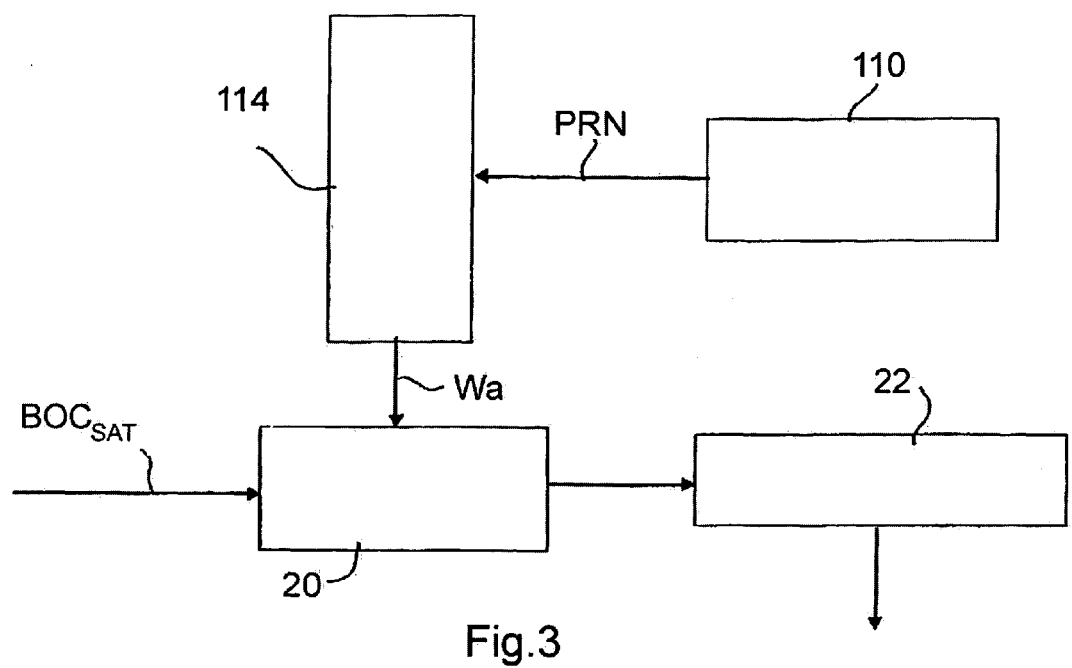
FIG. 3 is a block diagram of a second embodiment of an acquisition stage of a system according to an embodiment of the invention.

In FIG. 3 a variant of the embodiment in FIG. 2 is shown, in which an individual pseudo-random noise code generator 110 is locally used, rather than the generators of BOC modulated code and unmodulated code. A processing unit 114 is arranged for internally calculating the BOC modulated code from the pseudo-random noise code available from the generator 110 according to a predetermined law (for example, using well-known "pulse-shaping" techniques according to the Manchester coding for BOC(1,1) modulation, and generating a predetermined waveform $w_a$ as a function of a predetermined weight parameter.

Figure 4:
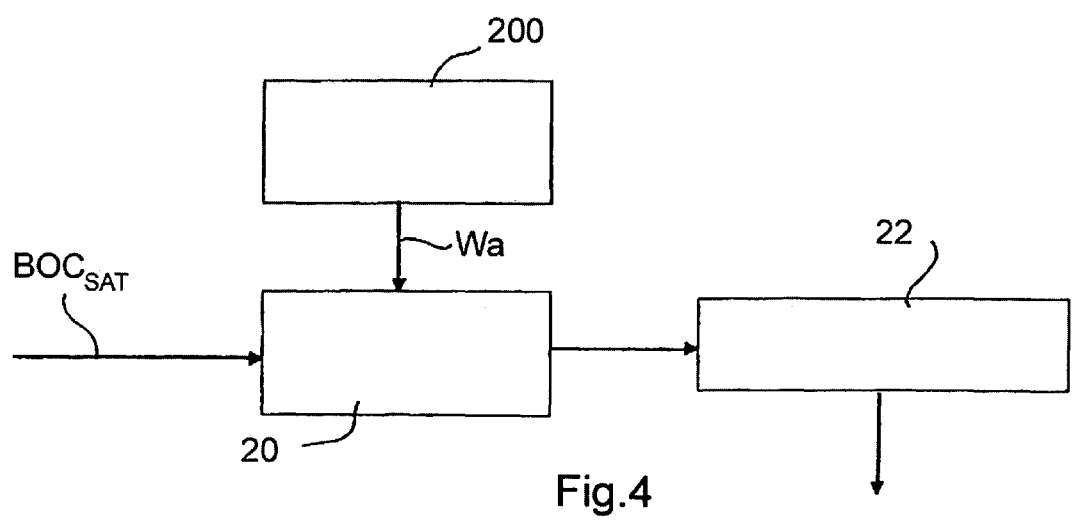
FIG. 4 is a block diagram of a third embodiment of an acquisition stage of a system according to an embodiment of the invention.

On the other hand, the block diagram in FIG. 4 illustrates a third embodiment of the system in which the correlator 20 receives a waveform $w_a$ directly to the local signal input thereof, which waveform has been previously synthesized and stored in a local memory module 200 of waveforms.

Figure 5:
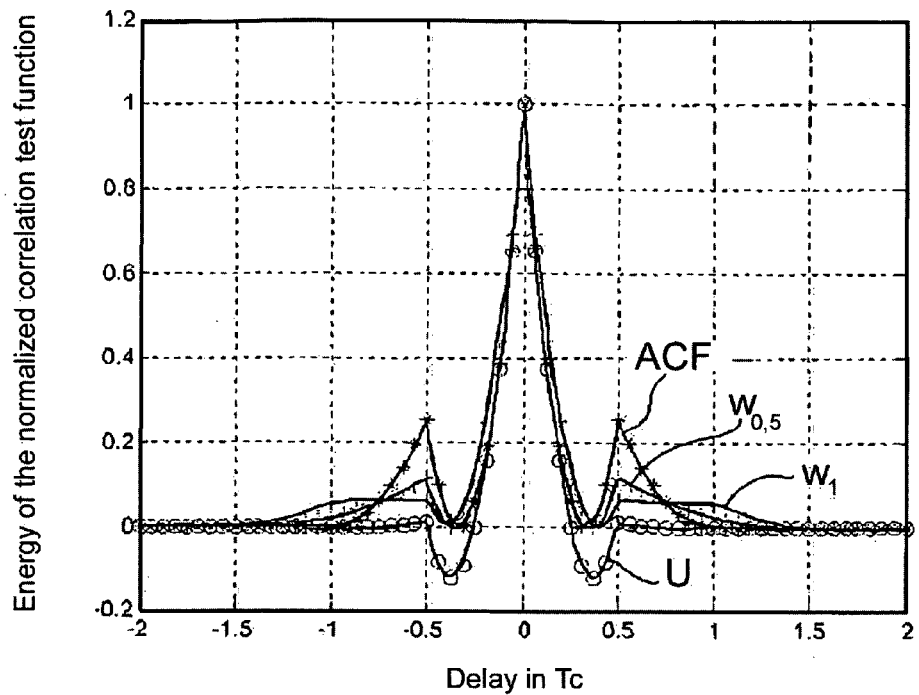
FIG. 5 is a diagram representing normalized test correlation functions according to the prior art and according to an embodiment of the invention, respectively.

Referring now to the first embodiment of the invention, a diagram is illustrated in FIG. 5, which represents the correlation energy normalized test functions, according to the prior art and embodiments of the invention, respectively, compared with each other, centered on the main peak. With ACF is designated the autocorrelation function between the BOC modulated signal received and the local replica thereof, with U is designated the test variable proposed in U.S. Patent Application Publication No. 2005/0270997, which is incorporated herein by reference, and with $w_{0.5}$ and $w_1$ are designated the correlation functions between the BOC modulated pseudo-random noise code and the waveform $w_a(\tau)$ for two weight values, a=0.5 and a=1, respectively. The curves on the diagram are drawn as a function of the delay expressed in $T_c$ in the range $[-2T_c, +2T_c]$. The result of the correlations is normalized at the highest value of the autocorrelation of the BOC modulated signal, designated with ACF.

It may be appreciated that the evident secondary peaks in the autocorrelation function ACF result to be very reduced in the case of cross correlation with the functions $w_{0.5}$ and $w_1$.

In the acquisition procedure, the waveforms $w_a(\tau)$ show the best performance in $w_{0.5}$ with weight a=0.5 in consideration of the better shape of the correlation function than that obtainable with the embodiment $w_1$ and weight a=1. In any case, the probability of lock on a secondary peak is reduced during the acquisition step. The embodiment $w_1$, on the other hand, exhibits the better performance during the tracking step, as it eliminates the stable lock points in the EML approach, which are spaced away from each other by $T_c/2$ distances, thus also allowing for the signal shift to be recovered to a maximum value of $T_c/2$ when the Early-Late interval in the tracking discriminator is set to $T_c/2$, as well as in terms of rejection of the multiple path interference.

Figure 6:
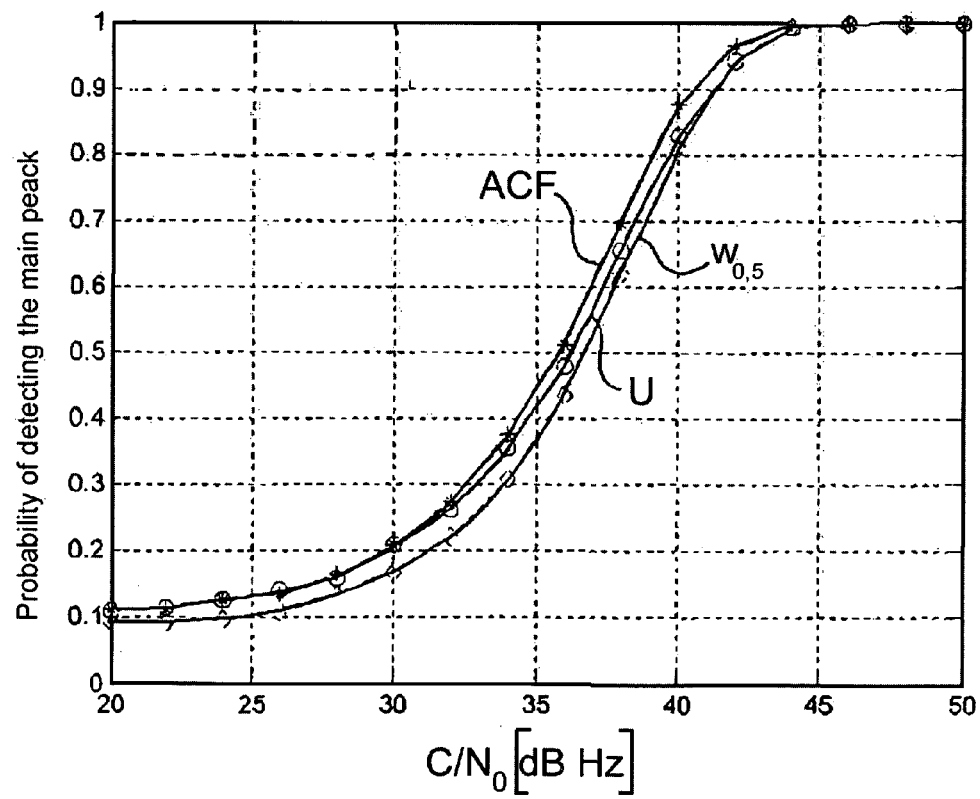
FIG. 6 is a diagram representing the detection probabilities of the main peak for different correlation functions.
Figure 7:
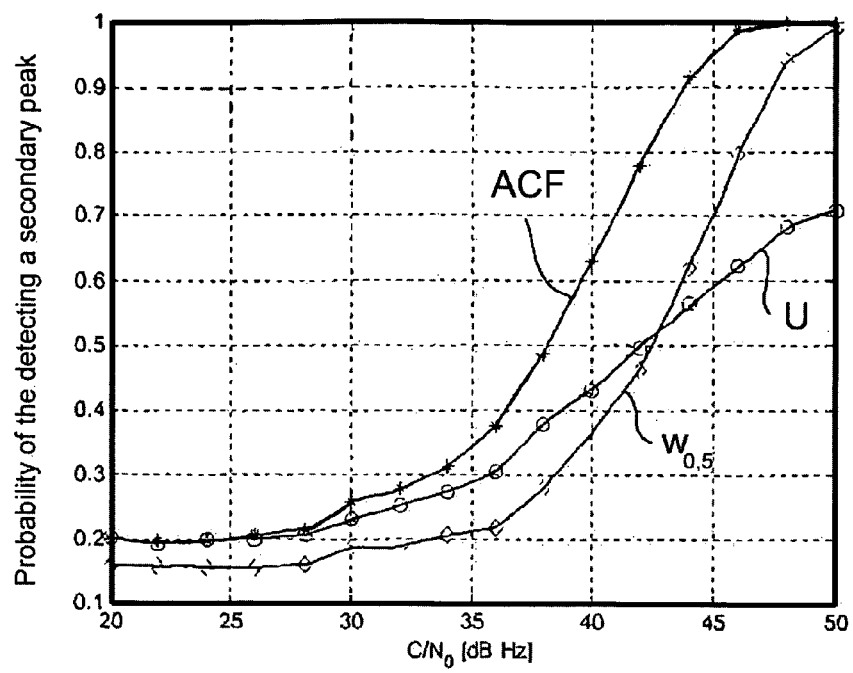
FIG. 7 is a diagram representing the detection probabilities of a secondary peak for different correlation functions.

In FIG. 6, it may be appreciated how the local code ($w_{0.5}$ in this case) during the acquisition step allows obtaining a performance similar to standard signals (ACF, U) with reference to the probability of detecting the main peak for a strategy of threshold acquisition as a function of the carrier signal-to-noise ratio $C/N_0$. In FIG. 7, it may be noted that the waveform $w_{0.5}$ results to be effective in reducing the probability of acquisition of a secondary peak as a function of the carrier signal-to-noise ratio $C/N_0$, still by comparison with the results obtainable via the known techniques discussed above.

As relates to the tracking step, in the traditional EML approach, the waveforms $w_a$ are used both in the local early replica ($w_a(\tau+\delta T_c)$) and in the local late replica ($w_a(\tau-\delta T_c)$) of the code, with a predetermined early-late interval, $2\delta$ in this case, with $\delta \ll 1$.

Accordingly, the architectures shown in FIGS. 2-4 and described with reference to the acquisition stages can be also applied in the tracking stages, provided that they are intended for generating and processing both early and late replicas of the code.

Figure 8:
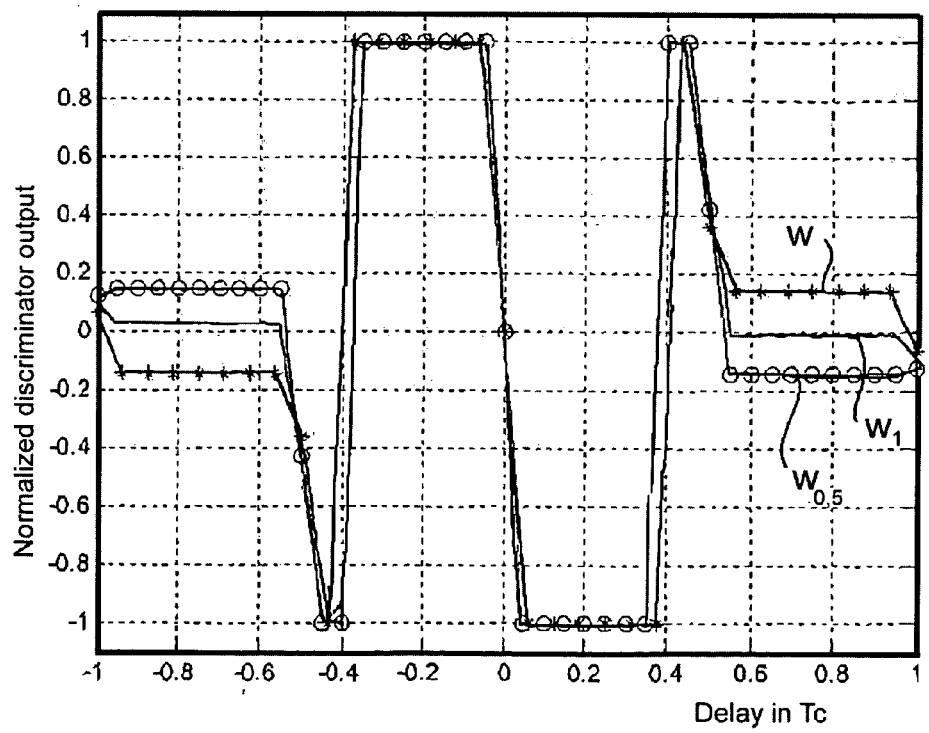
FIG. 8 is a diagram representing tracking discriminator curves S obtainable for different variants of a method according to an embodiment of the invention.

In FIG. 8, the discriminator curve S is reported in tracking with an Early-Late interval of $0.1T_c$, as a function of the delay in $T_c$, for different waveforms $w_{0.5}$, $w_1$ and $w_2$, which correspond to weight parameters a=0.5, a=1 and a=2, respectively. The first combination value (the waveform $w_{0.5}$ with a=0.5) exhibits a curve S with possible ambiguities, even though with a low discriminator value, falling outside the interval $[-0.35T_c, 0.35T_c]$. The second waveform $w_1$ (a=1) does not exhibit any ambiguity for the secondary peaks and the waveform $w_2$ (a=2) ensures the absence of stable false locks falling outside the interval $[-0.4T_c, +0.4T_c]$.

In any case, the discriminator function has a polarization due to the multiple access interference from other channels, for example from the other channels of the signal L1 in a GALILEO positioning system. This polarization can be reduced by increasing the weight of the contribution of the cross correlation. For example, by simulations it has been determined that when a weight a=0.5 is selected, a 7 cm polarization is obtained, whereas for a weight a=1, the polarization is lower than 2 cm.

Figure 9:
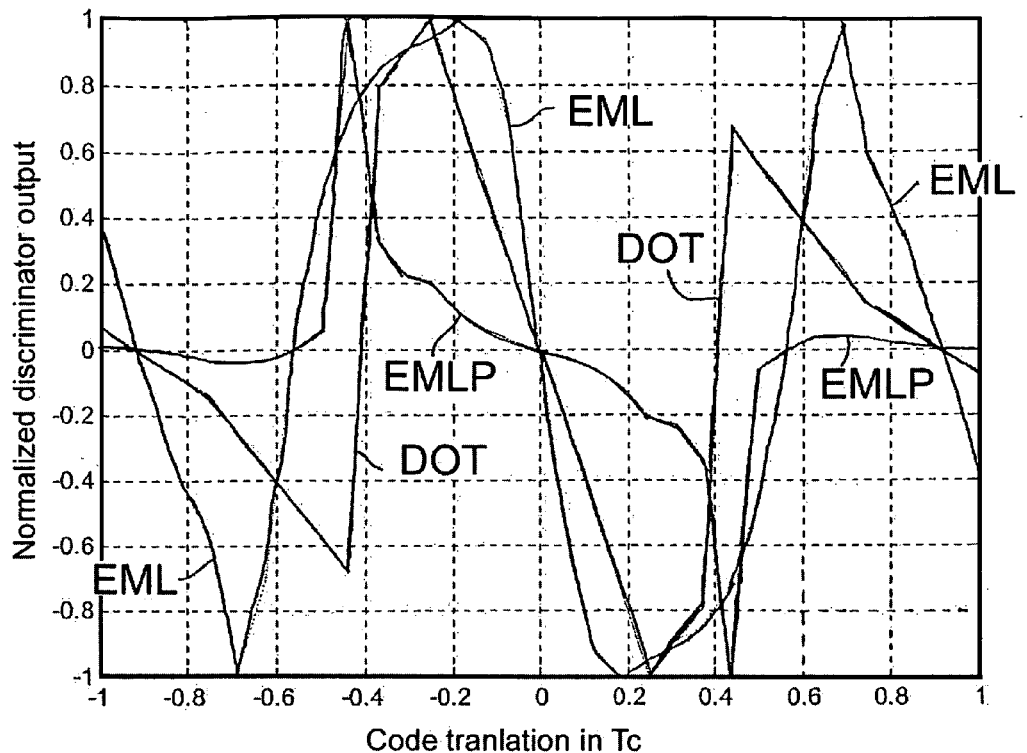
FIG. 9 is a diagram representing discriminator curves S according to a method according to an embodiment of the invention for different tracking methods, in a first operative condition.

The operative range can be increased by recovering each signal shift being within the interval $[-T_c/2, +T_c/2]$ considering an Early-Late interval of $T_c/2$. In this case, for a waveform $w_2$ (a=2) no stable point is evidenced to fall outside the interval $[-T_c/2, +T_c/2]$. This is shown in FIG. 9, which shows a comparison between the normalized curved S obtained in the above-mentioned conditions, a curve designated with EML and relative to an EML approach normalized to the sum of the correlation energies with the early and late replicas of the local code, a curve designated with DOT and relative to a DOT approach, and a curve designated with EMLP and relative to an EML approach normalized to the correlation energy with the synchronized replica or prompt. Two possible ambiguity points are indicated at $0.9T_c$, but in this case the probability is very low that the estimate of delay of the initial code from the acquisition step (usually, under normal operative conditions, the maximum error in the estimate of the delay of the signal from the acquisition is $T_c/2$), or the evolution of the tracking device may bring the estimate of the delay to these ambiguity points.

Figure 10:
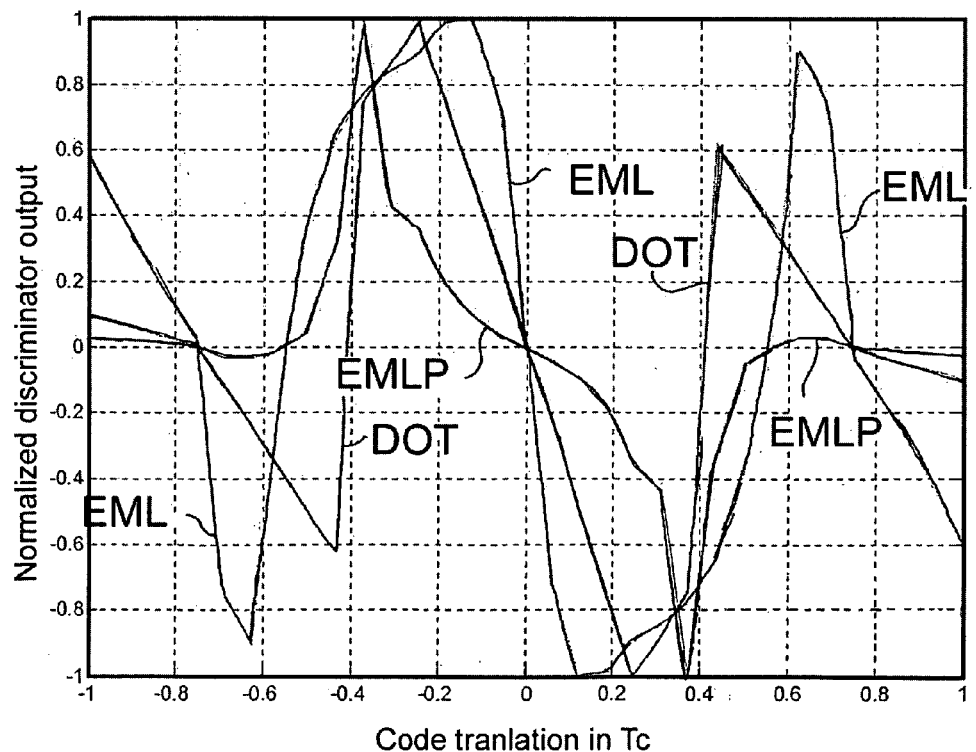
FIG. 10 is a diagram representing discriminator curves S according to a method according to an embodiment of the invention for different tracking methods, in a second operative condition.

In FIG. 10, similar curves S are reported for the waveform $w_1$ (a=1). In this case, the maximum operative range can be ensured by a traditional EML approach. As in the previous case, possible ambiguity points are at $0.7T_c$, but the above-discussed conditions will apply.

The waveforms are also effective in the rejection of the multiple path interference.

Figure 11:
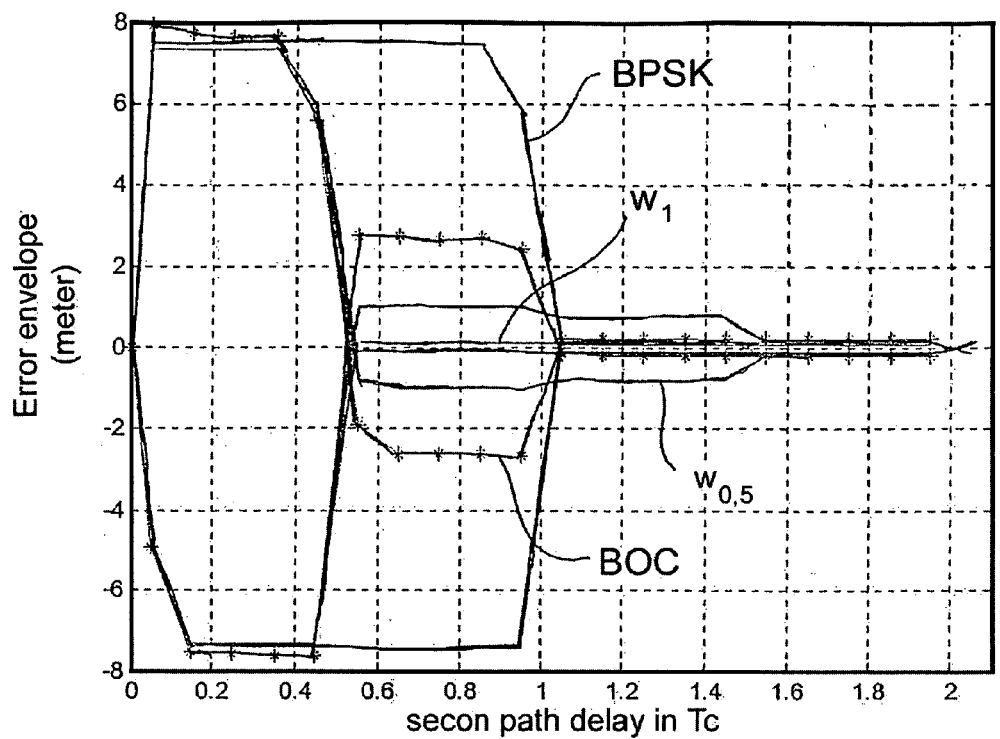
FIG. 11 is a diagram representing the comparison of tracking error envelopes between discriminator functions according to the prior art and to an embodiment of the invention, respectively.

FIG. 11 shows a comparison between the error envelopes in an EML discriminator function in the cases where a traditional autocorrelation function of BOC modulated signals (BOC curve) is used, of a BPSK modulated signal (BPSK curve) and in the case of correlation functions based on the waveforms $w_{0.5}$ and $w_1$, in any case with an Early-Late interval of $0.1T_c$.

It may be appreciated in the figure that for both waveforms $w_{0.5}$ and $w_1$, the error envelope can be compared to the traditional one for a delay of the second path lower than $0.55T_c$, whereas for delays ranging between $0.55T_c$ and $T_c$ the error envelope using the waveforms is lower than the traditional case, the minimum being obtained with the waveform $w_1$. On the other hand, for a delay of the second path greater than $T_c$, the waveforms have an error envelope greater than the traditional one ($w_{0.5}$) or of the same order of magnitude ($w_1$).

This characteristic can allow for an improved pseudorange estimate, and in the final analysis, an improved estimate of the position of a receiver in environments with multiple path interference, such as urban areas or the interiors of buildings.

Figure 12:
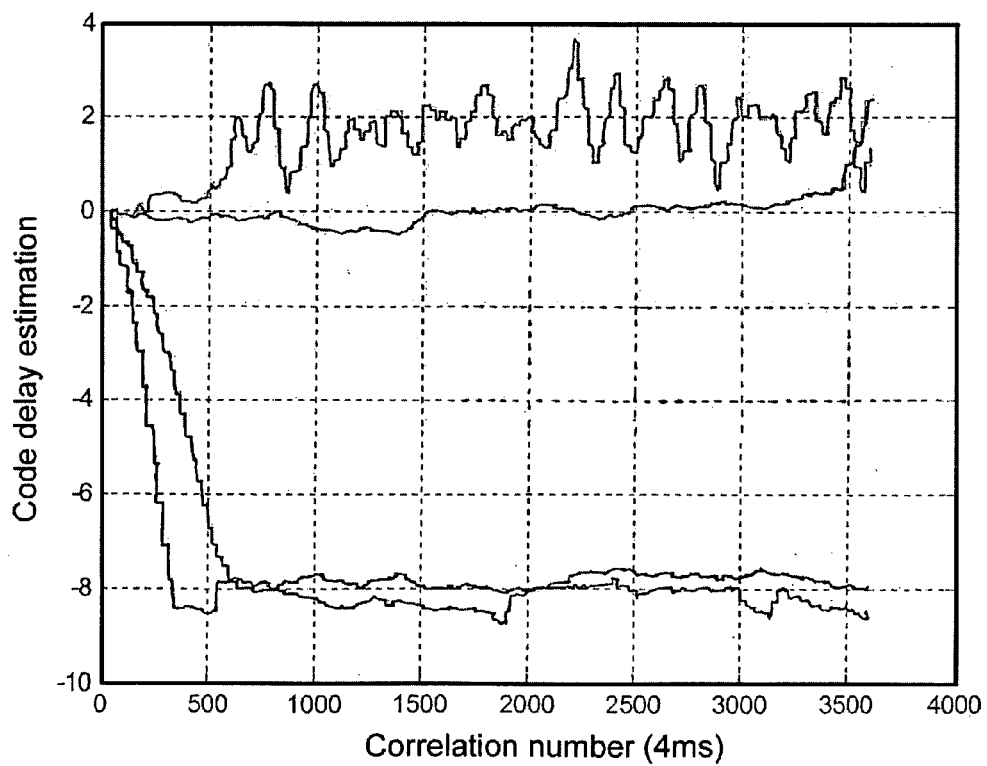
FIG. 12 is a diagram representing the comparison of code shift estimates in a tracking loop, according to the prior art and to an embodiment of the invention, respectively.

In FIG. 12 a comparison chart is illustrated of the development of the code delay estimate considering two implementations of EML discriminator with early-late spacing of $T_c/2$ and sampling of 16*1.023 MHz (i.e. 16 samples per chip), signal received delayed relative to the local replica of $T_c/2$ (i.e. 8 samples for these simulation values), ratio of carrier-noise signal $C/N_0$ of 40 dB Hz, absence of Doppler error. The BOC modulated local code (the two upper curves) is considered as well as the use of the waveform $w_2$ with weight a=2 (the two lower curves). In the figure, it may be seen how the estimates for the two embodiments with BOC modulated local code remain actually locked on the false lock point, while the two embodiments with the waveform $w_2$ proposed herein are capable of estimating the delay of the received code in a correct manner, and thus making up for it.

An alternative embodiment can be provided for the acquisition and tracking system, in which the BOC modulated signal received from the satellite is separately correlated with the three components ($c(\tau_n)$, $PRN(\tau_n+T_c/2)$, $PRN(\tau_n-T_c/2)$), of the waveform $w_a(\tau)$ and subsequently, the three correlation outputs are combined by applying the coefficients and the generation formula of the total waveform $w_a(\tau)$.

Figure 13:
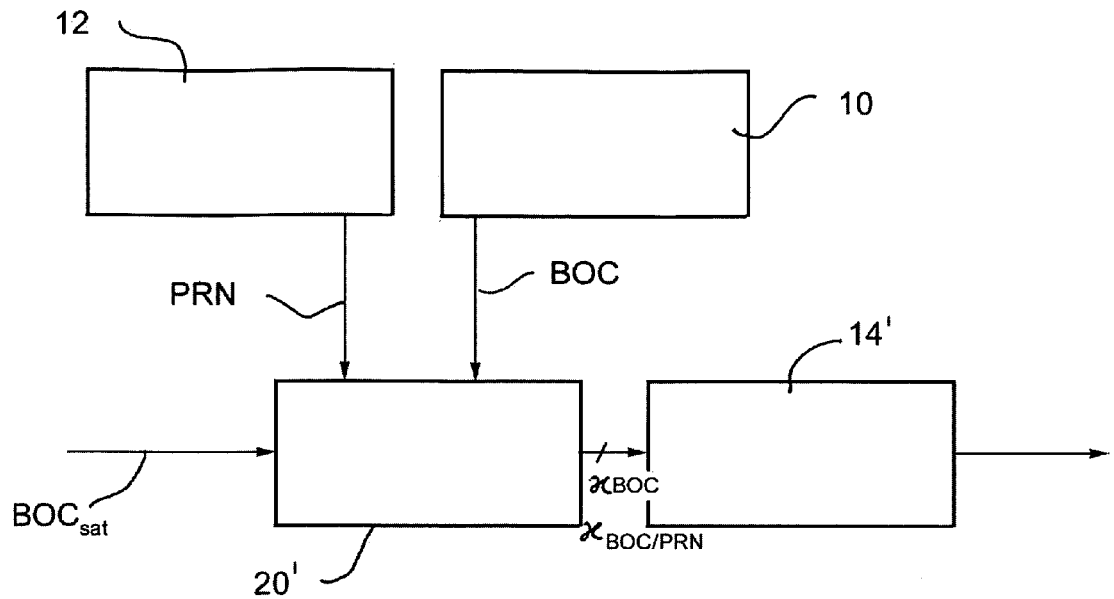
FIG. 13 is a block diagram of a first alternative embodiment of an acquisition or tracking stage of a system according to an embodiment of the invention.
Figure 14:
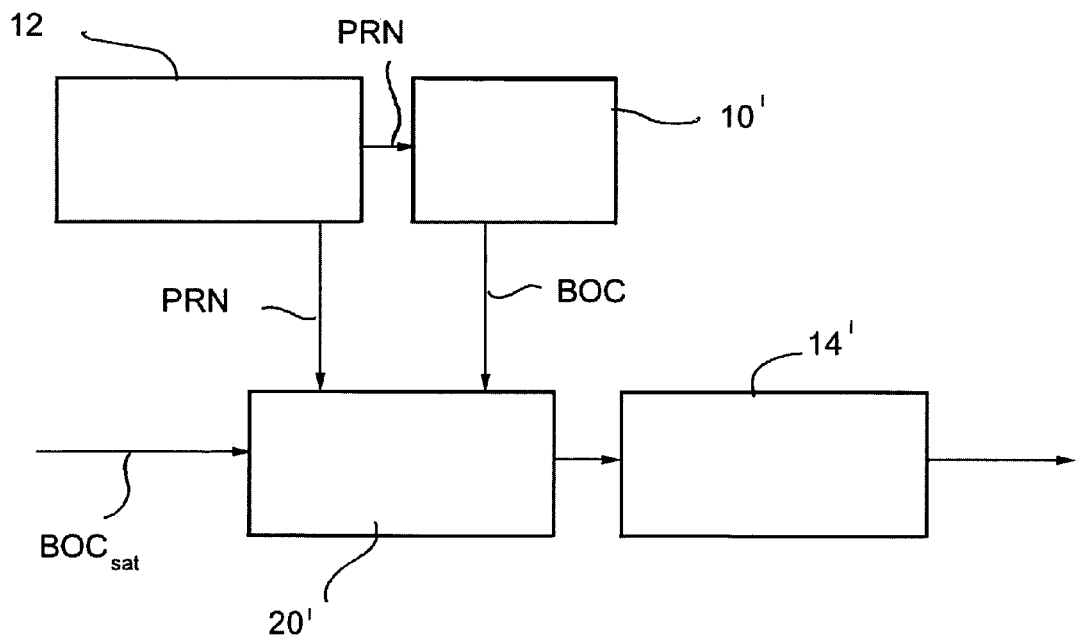
FIG. 14 is a block diagram of a second alternative embodiment of an acquisition or tracking stage of a system according to an embodiment of the invention.

This would have the disadvantage of increasing the number of correlators in the architecture of the stages of signal acquisition and tracking, as shown in FIGS. 13 and 14.

In FIG. 13, a block diagram is depicted of a first acquisition or tracking stage of a BOC modulated signal in a receiver, in which a BOC modulated pseudo-random noise signal (code) generator is indicated with 10, and an unmodulated pseudo-random noise signal (code) generator is designated with 12. The generators 10 and 12 are arranged for generating a BOC modulated pseudo-random noise local code and the same unmodulated pseudo-random noise code, designated with BOC and PRN, respectively, and providing these codes to a plurality of correlators that are generally designated with 20', suitable for calculating the cross correlation between said duly offset codes (as required by the expression of the waveform $w_a(\tau)$) and a $BOC_{SAT}$ signal received from a satellite at a further input.

The results of the correlations $x_{BOC}$, $x_{BOC/PRN}$ are thus provided to a downstream combinator module 14', suitable for carrying out the combination of the above-mentioned correlation results in compliance with the expression of the waveform $w_a(\tau)$ of the waveform family according to embodiments of the invention.

The result is then provided to subsequent processing modules (not illustrated) of the acquisition stage.

In FIG. 14, a variant embodiment of FIG. 13 is shown, in which a generator module 10' of a BOC modulated pseudo-random noise signal (code) is provided, which is suitable to receive at an input thereof the pseudo-random noise code PRN available from the generator 12 and to internally calculate the BOC modulated code similarly to what is actuated by the processing unit 114 in FIG. 3.

Similar architectures are used in the detail of the tracking stages, where it should be understood, however, that the BOC modulated code generator outputs a pair of signals, in the early and late versions thereof, respectively, and the unmodulated pseudo-random noise generator outputs four replicas of the code, early and late replicas, respectively, for each of the two components of the waveform $w_a$.

The drawback of the increase in the number of correlators can be mitigated by applying a 1 bit quantization to the signal received, because a simple correlator structure is thus required, which is suitable for treating only sign bit inputs. On the contrary, the application of the total waveform $w(\tau)$ input to a correlator would however impose the use of a correlator suitable for managing multi-bit inputs, i.e. being more complex and expensive than correlators with only sign bit inputs.

Referring now to the second embodiment of the invention, in this section we focus the attention on the sine BOC(6,1) signals, but all the considerations are applicable to any sine BOC(m,n) signal with m≠n and m/n equal to an integer.

Figure 15:
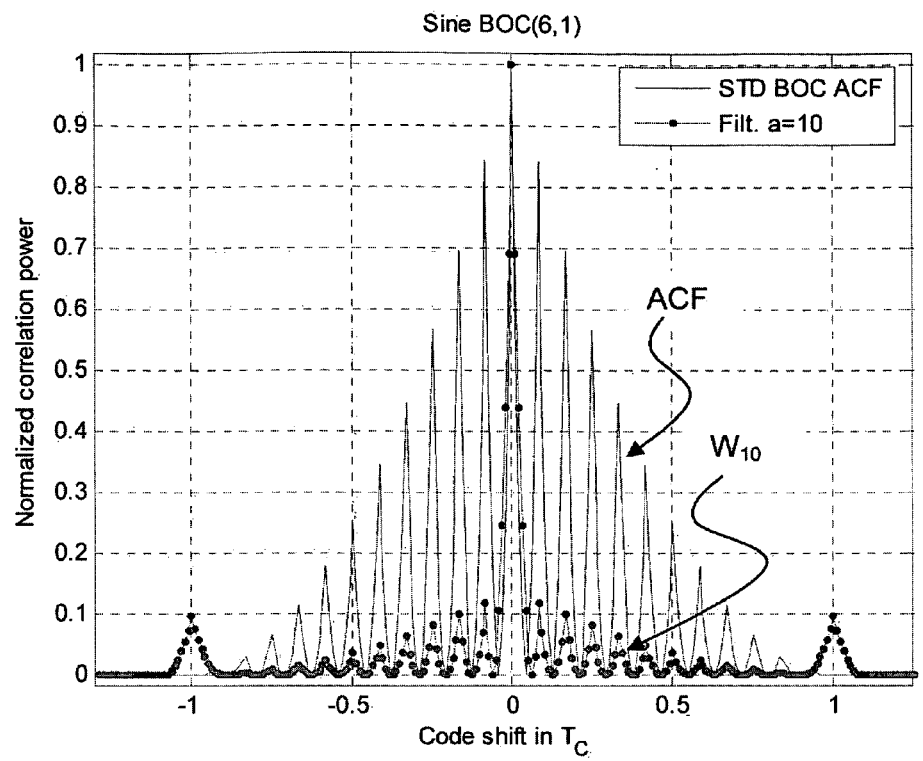
FIG. 15 is a diagram representing normalized test correlation functions according to the prior art and according to an embodiment of the invention, respectively, for a sine BOC(6,1) modulated signal.

The correlation output between the sine BOC(6,1) modulated pseudo-random noise code and the waveform $w_a(\tau)$ for the weight value a=10 is shown in FIG. 15, where with ACF is designated the standard autocorrelation function and with $w_{10}$ is designated the correlation function according to an embodiment of the invention. We can see the secondary peaks separation improvement reducing the probability of lock on a secondary peak during the acquisition stage even if we have introduced two peaks symmetrically placed $T_c$ apart the main peak.

Figure 16:
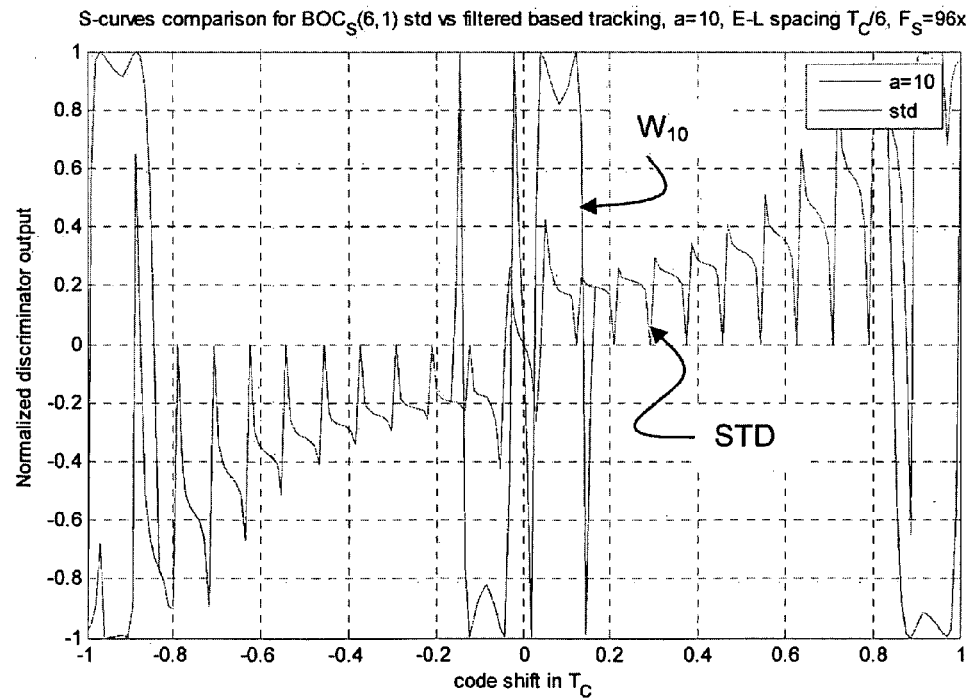
FIGS. 16 and 17 are diagrams representing tracking discriminator curves S obtainable for different variants of a method according to an embodiment of the invention.
Figure 17:
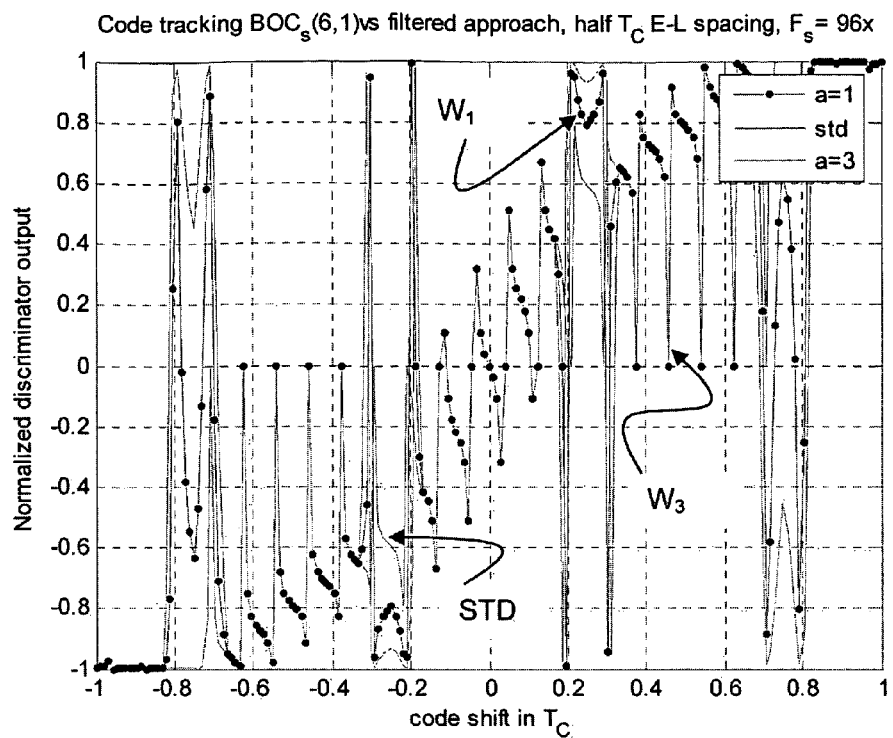

Regarding the tracking stage, we can see from FIGS. 16 and 17 the performances according to the proposed signal processing. FIG. 16 represents EML tracking discriminator S-curves comparisons between the standard STD approach and the filtered one, with weight value a=10 and early-late spacing equal to $T_c/6$. FIG. 17 represents EML tracking discriminator S-curves comparisons between the standard STD approach and the filtered one, with weight values a=1 and a=2 and early-late spacing equal to $T_c/2$.

Referring now to the third embodiment of the invention, for cosine BOC(n,n) signals the same considerations as regards the first embodiment holds for acquisition and tracking.

Figure 18:
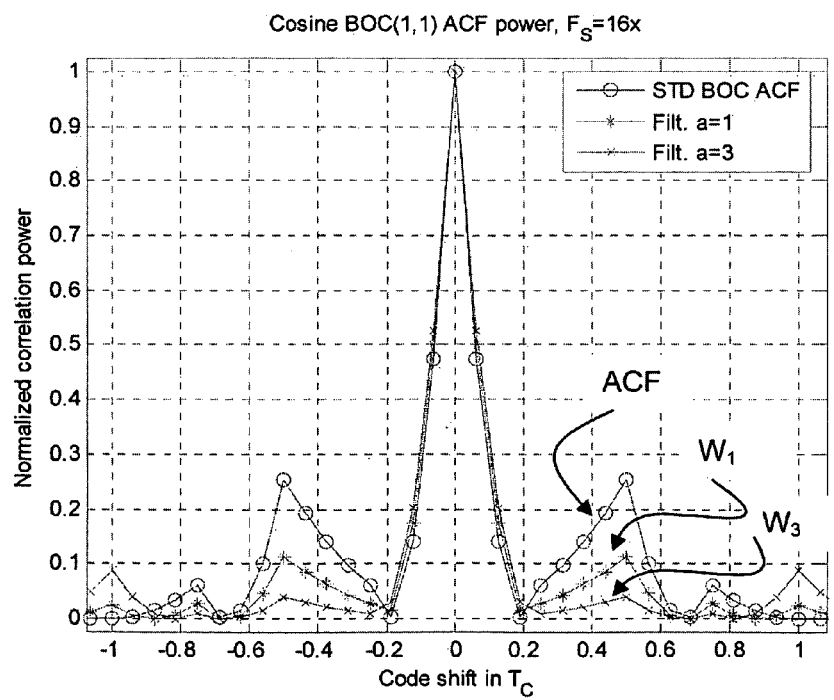
FIG. 18 is a diagram representing normalized test correlation functions according to the prior art and according to an embodiment of the invention, respectively, for a cosine BOC (1,1) modulated signal.

On the code tracking we have also to note that for cosine BOC greater combing value has to be used in order to obtain the desired ambiguity reduction leading to more noisy tracking loops w.r.t. the sine BOC case when noisy received signals are considered. In FIG. 18 representing the correlation output between the cosine BOC(1,1) modulated pseudo-random noise code and the waveform $w_a(\tau)$ for the weight value a=1 and a=3, where with ACF is designated the standard autocorrelation function and with $w_1$ and $w_3$ are designated the correlation functions according to embodiments of the invention, we can see the secondary peaks separation improvement reducing the probability of lock on a secondary peak during the acquisition stage. Note also that in this case the correlation with the filtered introduced two peaks symmetrically placed $T_c$ apart the main peak, their maximum value depending upon the combining weight.

Figure 19:
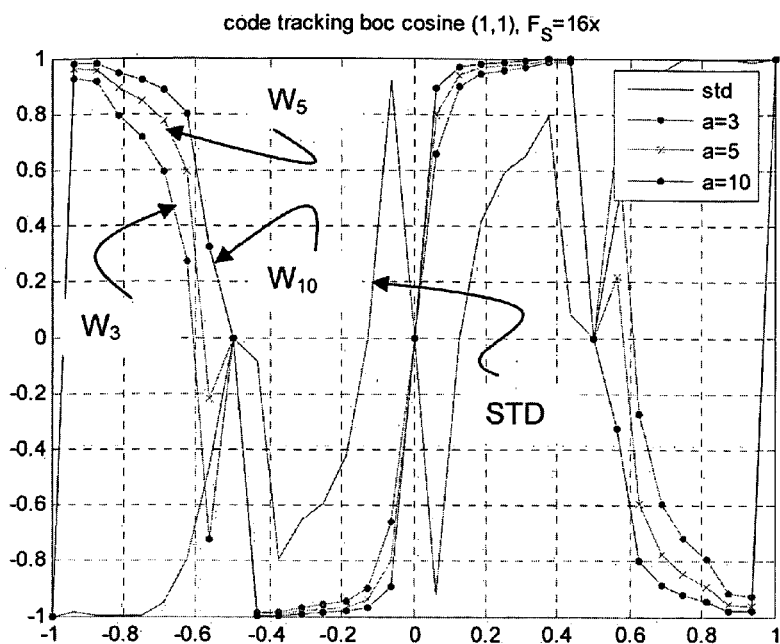
FIG. 19 is a diagram representing tracking discriminator curves S obtainable for different variants of a method according to an embodiment of the invention.

Regarding the code tracking ambiguity reduction in FIG. 19, representing EML tracking discriminator S-curves comparisons between the standard STD approach and the filtered one, with weight values a=3, a=5, a=10, we can see as applying the third embodiments of the invention with a proper combining weight we can eliminate the two possible ambiguity points around half chip time, symmetrically placed w.r.t. the zero lag position, for early-late spacing of $T_c/2$ and 16 samples per chip. Moreover, properly choosing the combining weight and the early-late spacing we can recovery unambiguously delays up to $0.45T_c$.

Figure 20:
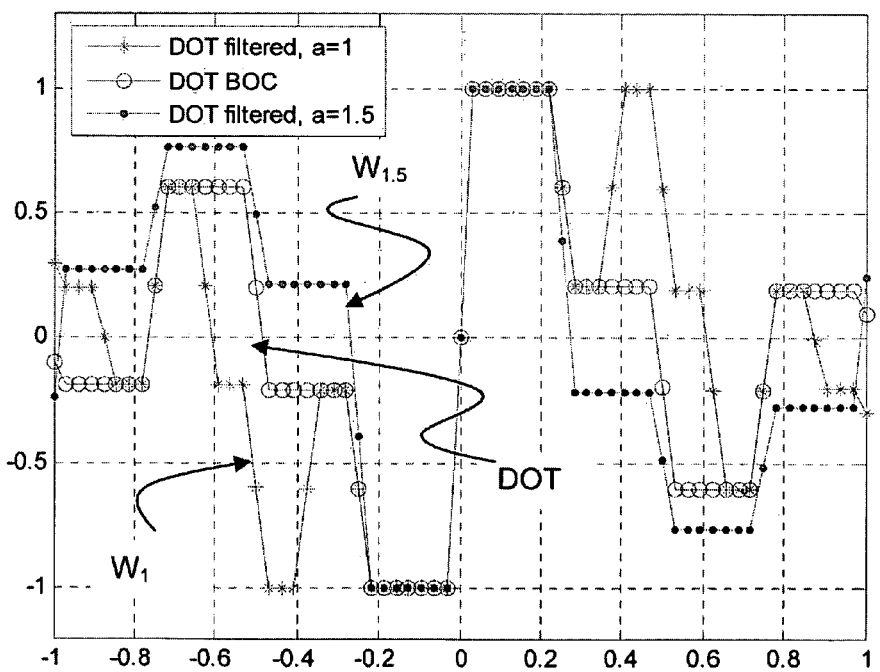
FIGS. 20 to 23 are diagrams representing discriminator curves S according to a method according to an embodiment of the invention for different tracking methods.
Figure 21:
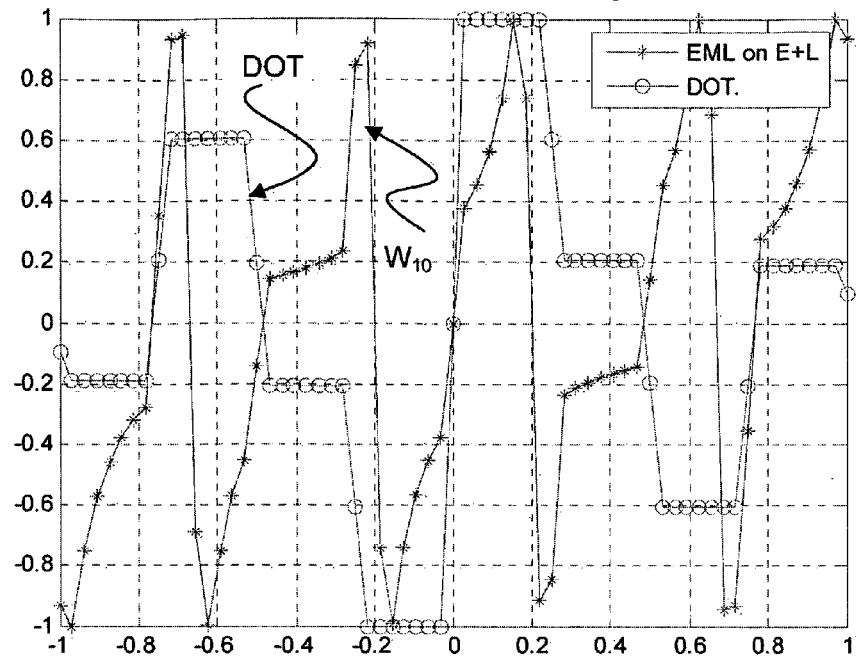

Waveforms according to the third embodiment of the invention may present problems with lower early-late spacing and higher sampling frequency. In this case better performances can be obtained applying waveforms according to the fourth embodiment of the invention in the early and late branches of the DOT tracking scheme and the local BOC modulated code in the prompt branch as in FIG. 20, with early-late spacing equal to $T_c/16$. In this figure we can see as the proposed solution $w_1$ and $w_{1.5}$ (with a=1 and a=1.5) or greater can overcome the secondary lock points ambiguity with the drawback of a reduction of the discriminator operating range, e.g. we can recover shifts up to $0.25T_c$ while the standard DOT approach STD can recover up to $0.45T_c$. Moreover, with this sampling frequency and the same early-late spacing ($T_c/16$) we can see as the standard EML tacking scheme applied to cosine BOC presents four ambiguity lock points, as in FIG. 21.

Drawback of the DOT code tracking with waveforms according to the fourth embodiment of the invention in the early minus late branch is the reduced multipath rejection capability.

Figure 22:
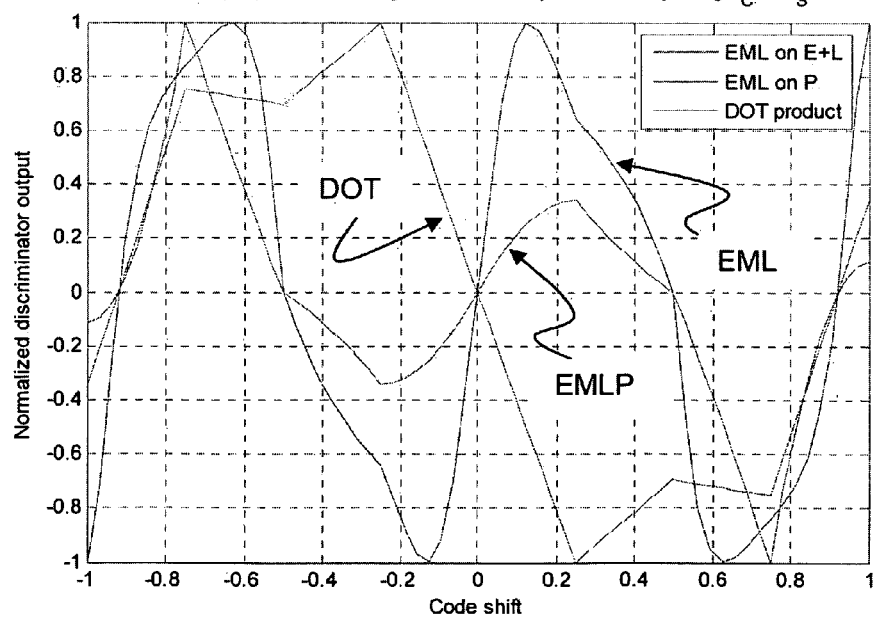
Figure 23:
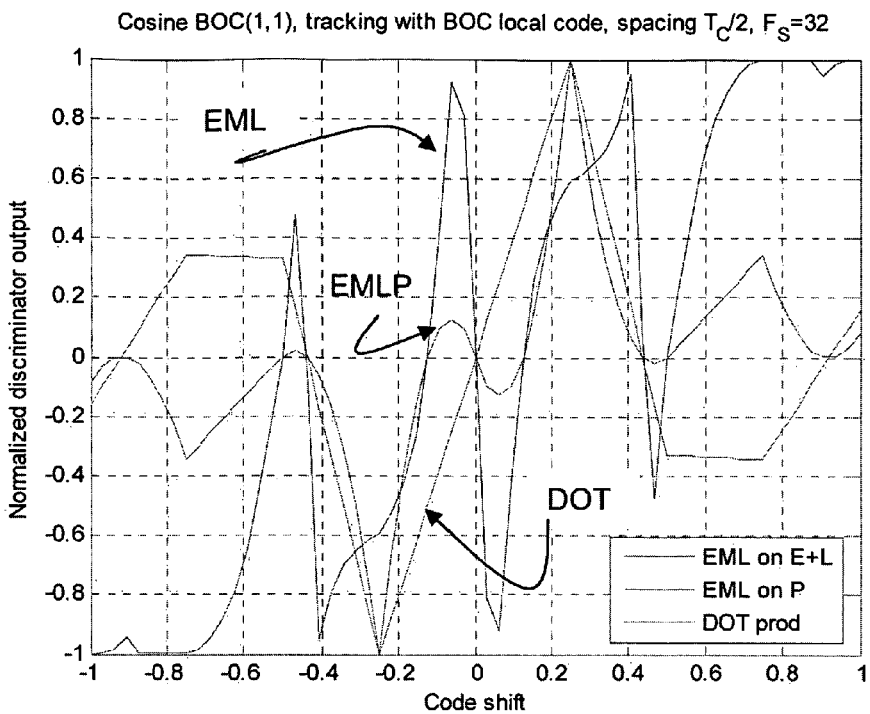

Considering $T_c/2$ early-late spacing and waveform $w_3$ (with a=3) according to the fourth embodiment of the invention (and sampling frequency 32×), we have the S-curves in FIG. 22, where we can see as for EML implementations the two possible ambiguity points are located more or less $0.9T_c$ apart (symmetrically) the zero-lag position and they can be easily discarded checking the prompt energy. In this case we are able to recover code delays in the range $[-T_c/2, +T_c/2]$. From the same figure we can see as the DOT-product approach does not present ambiguity points, and can recover delays in the range $[-0.9T_c, 0.9T_c]$ Considering FIG. 23, where we shows the same S-curves for the same tracking discriminators when only cosine BOC modulated local code is used at the receiver, we can easily see as the proposed waveform enhances the operating range of all three the discriminators, mitigating the ambiguity problems at least shifting these points in positions with a really low prompt energy enabling easy ambiguity recognizing.

Referring now to cosine BOC(m,n) signals, in this section we focus our attention on the cosine BOC(15,2.5) proposed for Galileo L1 PRS channel, but all the considerations are applicable to any cosine BOC(m,n) signal with m≠n and m/n equal to an integer.

Figure 24:
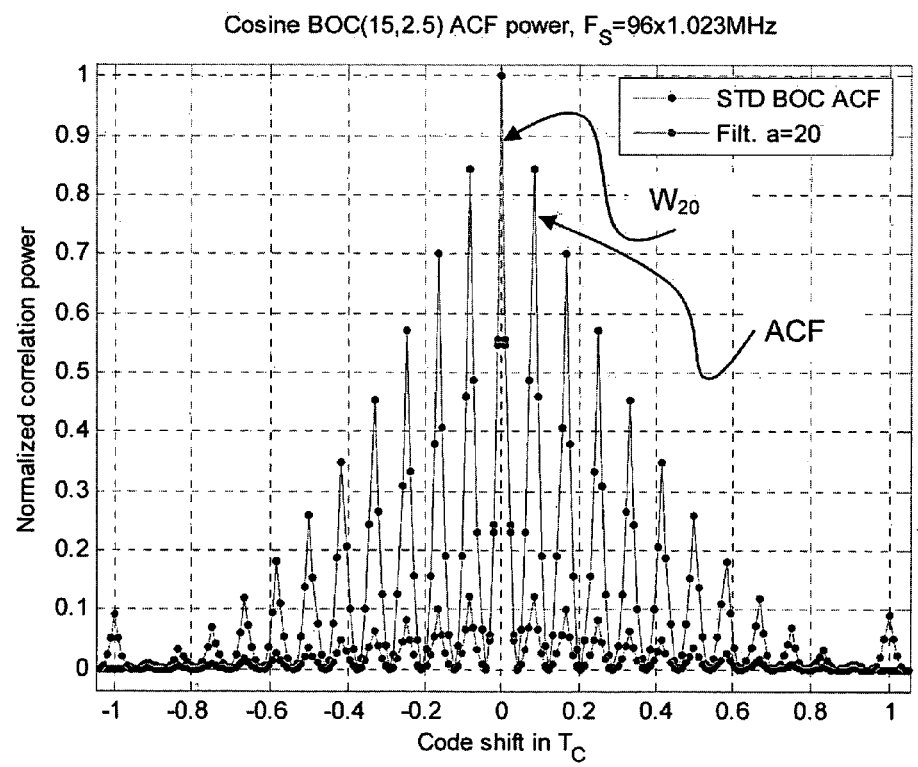
FIG. 24 is a diagram representing normalized test correlation functions according to the prior art and according to an embodiment of the invention, respectively, for a cosine BOC (12,2.5) modulated signal.

The correlation output between the cosine BOC(15,2.5) modulated pseudo-random noise code and the waveform $w_a(\tau)$ for the weight value a=20 according to the third embodiment of the invention is shown in FIG. 24, where with ACF is designated the standard autocorrelation function and with $w_{20}$ is designated the correlation function according to the third embodiment of the invention. From FIG. 24 we can see the secondary peaks separation improvement reducing the probability of lock on a secondary peak during the acquisition stage for a $BOC_c(15,2.5)$ when correlating with a local code defined according to a third embodiment of the invention for a proper combining weight choice. Moreover we can see that a correlation shape is achieved with only three peaks, the main one and two symmetrically spaced $T_c$ apart at a price of lower maximum correlation peak.

Figure 25:
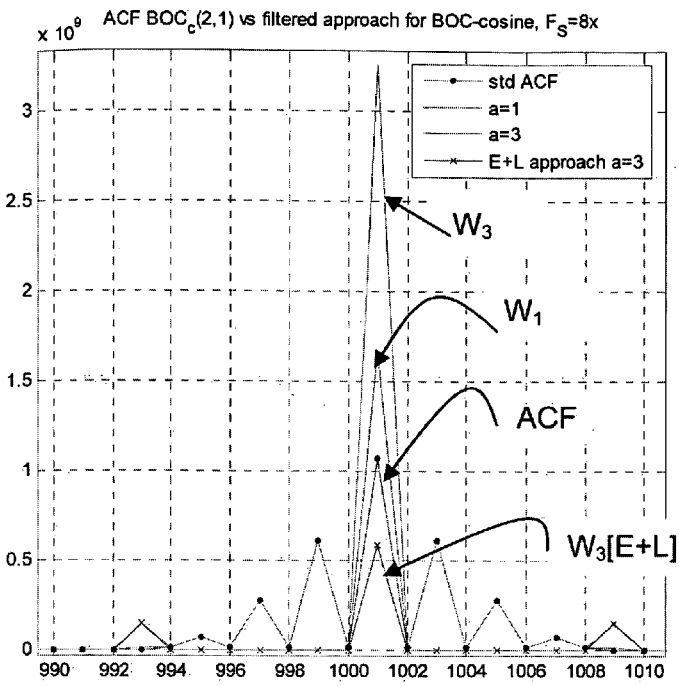
FIG. 25 is a diagram representing normalized test correlation functions according to the prior art and according to an embodiment of the invention, respectively, for a cosine BOC (2,1) modulated signal.

In FIG. 25 we show the same consideration for a cosine BOC(2,1) signal.

Figure 26:
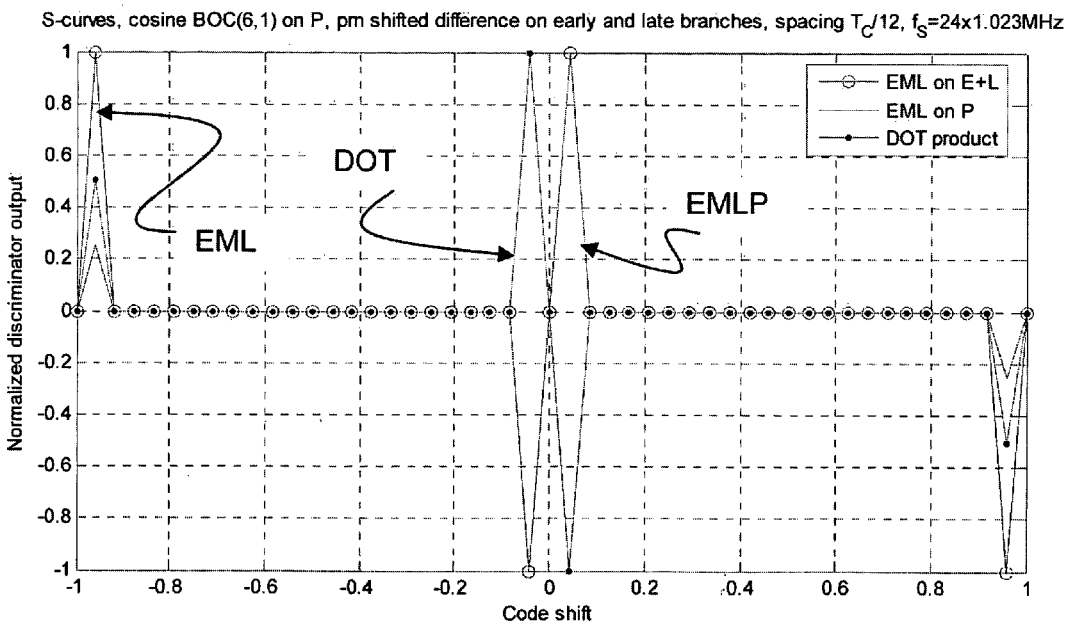
FIG. 26 is a diagram representing discriminator curves S according to a method according to an embodiment of the invention for different tracking methods.

Applying a waveform according to a fifth embodiment of the invention on the early and late branches both of the EML implementations and of the DOT product tracking scheme we can reduce ambiguity maintaining fairly good multipath rejection capability also for cosine BOC(m,n) modulated signals, as can be recognized from FIG. 26.

In this figure we show S-curves for a received cosine BOC (6,1) modulated signal (note this signal is equivalent to cosine BOC(15,2.5)), for early-late spacing $T_c/12$, sampling frequency 24×1.023 MHz, local BOC modulated code on the prompt branch and waveform according to the fifth embodiment of the invention on early and late branches, EML and DOT product implementations. Note as the possible ambiguity points are in positions where a prompt energy check can easily discard them.

Figure 27:
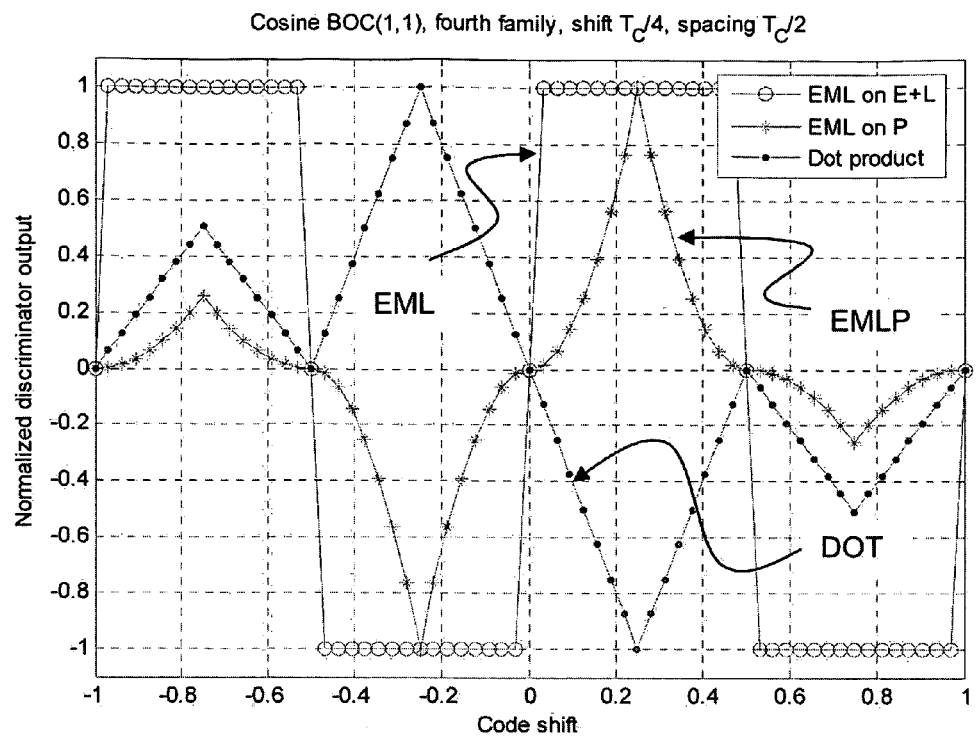
FIGS. 27 and 28 are diagrams representing discriminator curves S according to a method according to an embodiment of the invention for different tracking methods.
Figure 28:
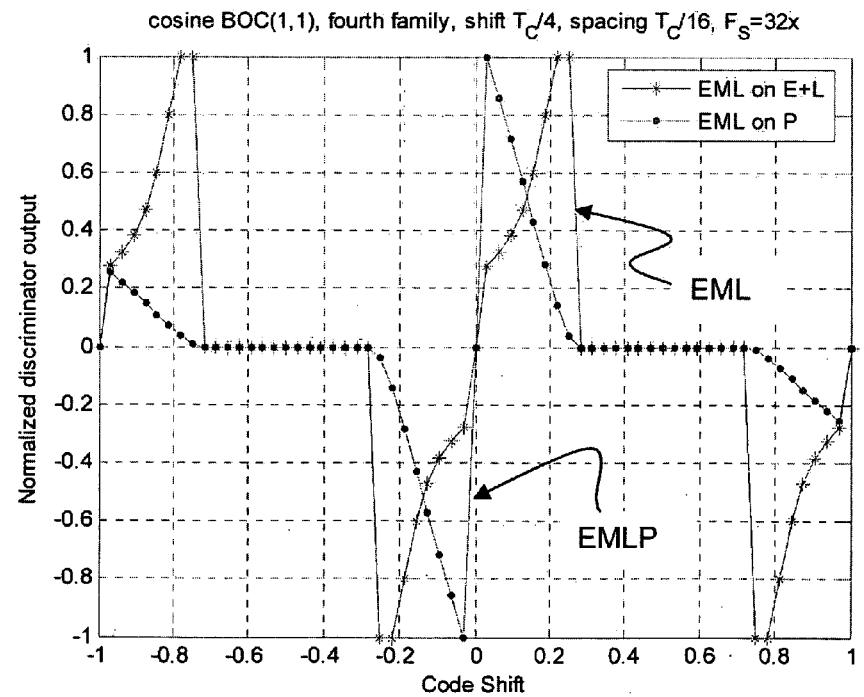
Figure 29:
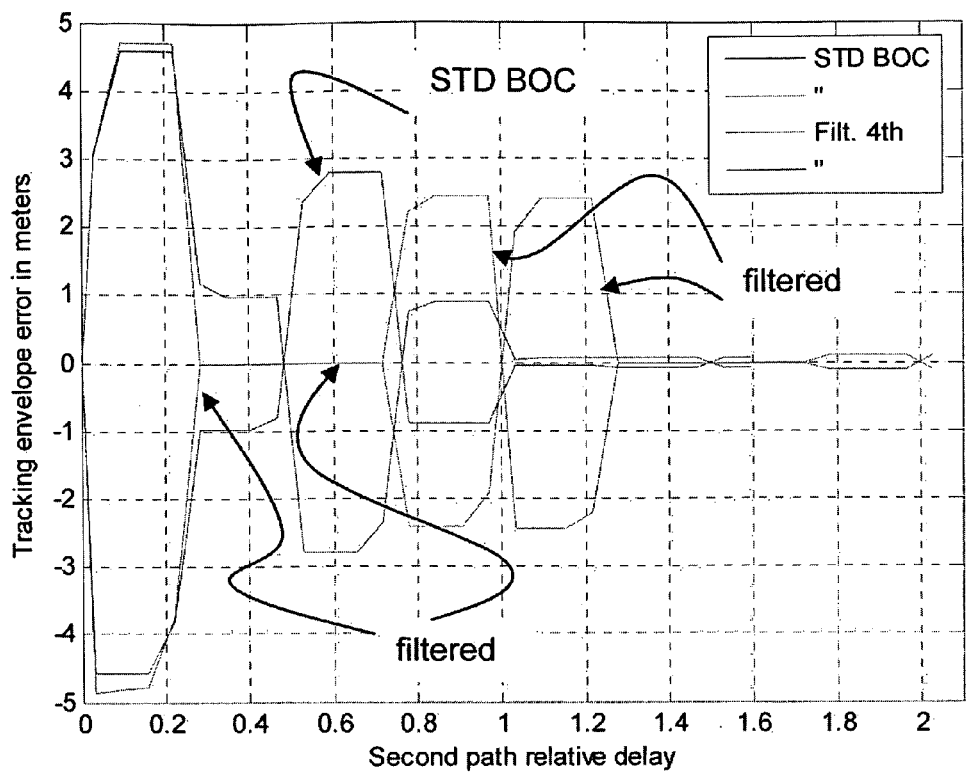
FIG. 29 is a diagram representing the comparison of tracking error envelopes between discriminator functions according to the prior art and to an embodiment of the invention, respectively.

Still referring to the fifth embodiment of the invention, in FIGS. 27 and 28 we show the S-curves for EML and DOT product implementations with early-late spacing equal to half $T_c$ and $T_c/16$ respectively. In this case we can see as also this waveform family can overcome the tracking ambiguity problem for the cosine BOC(n,n) again increasing the operating range, with possible ambiguity points in positions where a prompt energy check can easily recognize them. Moreover this approach present the best performance w.r.t. multipath rejection as can see from FIG. 29, where we show the multipath error envelope for EML on E+L tracking discriminator considering a two path model (LOS plus reflection), with secondary path power 6 dB below the LOS. In this figure we can see as the proposed approach outperforms the standard one for secondary path delays in the range $[0.25T_c, 0.75T_c]$; it presents also an error envelope greater than the standard one in the range $[0.75T_c, 1.25T_c]$.

Note that this last waveform family can be applied to the code tracking for the more general case of cosine BOC(m,n) with m/n equal to an integer value as shown in the next section.

Figure 30:
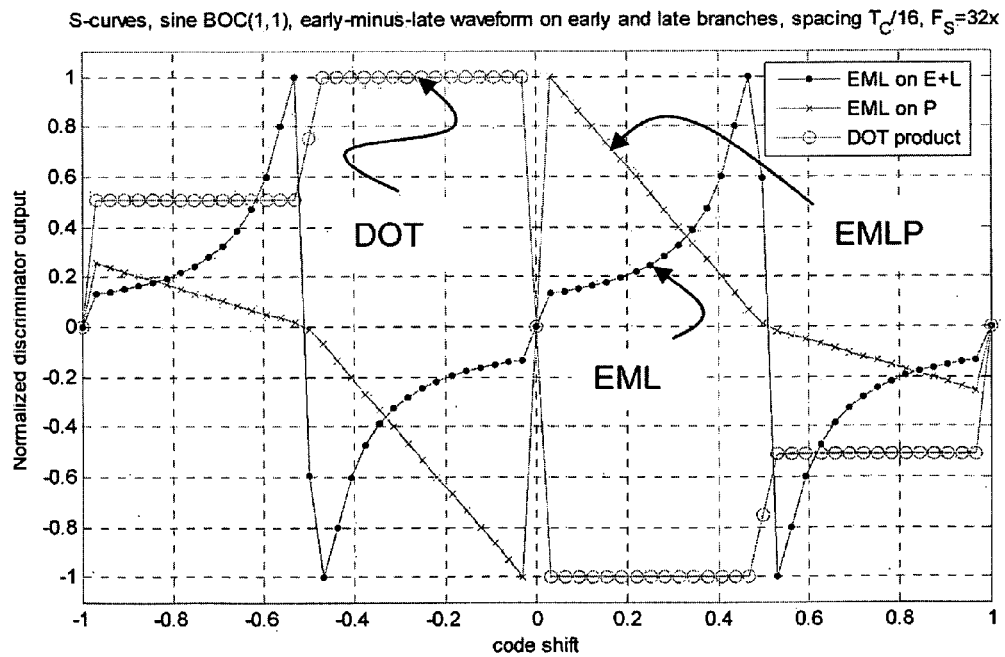
FIGS. 30 and 31 are diagrams representing discriminator curves S according to a method according to an embodiment of the invention for different tracking methods.

Referring now to the sixth embodiment of the invention for sine BOC(m,n) signals, in FIG. 30 we show the tracking S-curves, both for two EML discriminator implementations and for the DOT product discriminator (early-late spacing $T_c/16$), obtained applying on the early and late branches a waveform according to a sixth embodiment of the invention as local code for a received sine BOC(1,1) modulated signal.

As can be seen, this approach can effectively mitigate the ambiguity problem shifting the two possible false lock points for EML implementations in a position (one chip apart the right lock position) where it is easy to recognize them using the prompt power (very low if evaluated in these points). Moreover the EML implementations allow recovering unambiguously code shifts in the range $[-0.5T_c, 0.5T_c]$ not feasible with standard approach using local BOC modulated codes, meaning an increased operating range for the code tracking w.r.t. the standard implementation. We can see also as the DOT approach does not suffer from ambiguity problem in the (increased) operating range, allowing the recovery of code shifts up to ±0.9$T_c$, again not possible in standard DOT-product implementation with local BOC modulated codes.

Figure 31:
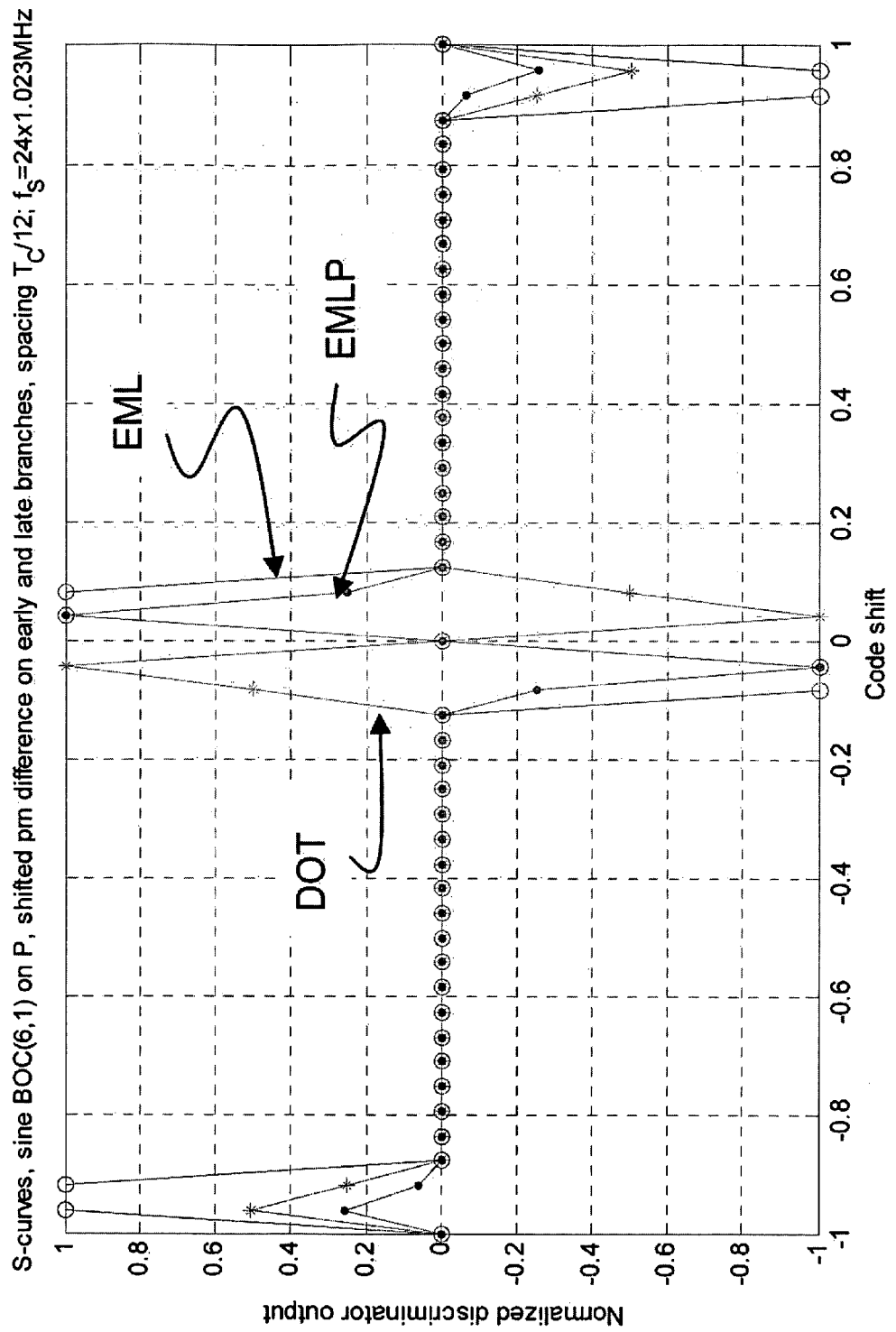

In FIG. 31 we show the S-curves when waveform according to the sixth embodiment of the invention is applied as local code in early and late branches of the tracking discriminators to a sine BOC(6,1) modulated received signal. Again we can see as the two possible ambiguity points are $T_c$ apart the right peak. These are positions where the ambiguity is easily recognizable comparing the prompt energy with a proper threshold, because in these positions this energy is very low.

In conclusion, advantageously, the methods and systems according to embodiments of the invention allow increasing the ratio of the main peak to the secondary peak of a correlation function during the step of acquisition of a BOC modulated signal to about 9-10 dB, thus reducing the probability of acquisition of secondary peaks.

The system can be implemented with the same number of correlators and the same computational complexity as required for processing GPS signals, thus allowing the possibility of providing so-called "dual-mode" receivers, with software-aided selection of the operating mode.

The families of waveforms $w_a$ also allow avoiding the generation of secondary stable lock points in the tracking discriminator curve S for a wide range of Early-Late intervals for BOC(n,n) modulated signals.

Particularly, with an Early-Late interval of $T_c/2$ the signal shifts can be also recovered to a maximum of ±$T_c/2$ for sine BOC(n,n) and ±0.45$T_c$ for cosine BOC(n,n), which is also impossible with the traditional EML or DOT embodiments. This allows restraining the signal research space during the acquisition step by adopting a maximum granularity (i.e. spacing between two consecutive delays considered during the acquisition step) of signal shift of $T_c/2$, as in the case of the GPS system, even though a granularity of $T_c$ can also be used. This avoids using a granularity of $T_c/4$ for obtaining an acceptable performance, as provided in the known techniques. Therefore, the acquisition advantage is the possibility of considering a lower number of delays spaced away from each other, thus reducing both the calculations and, with the hardware being the same, the time spent during the acquisition step for declaring that a signal is/is not present and evaluating the general delay of the latter.

By comparison, the disadvantage of the known techniques is the increase in the points (or delays) to be considered in the search domain of the acquisition system, and this entails an increase in the calculations (e.g. the correlations that must be carried out for each delay in the search domain) and—the hardware being the same—the increase in the acquisition time (or, with dual considerations, in order to maintain this time unchanged, the system operating frequency or the parallelism degree of the hardware require to be increased such as to carry out more parallel correlations).

Embodiments of the system provide improved rejection of multiple path interference during the tracking, which allows obtaining an improved precision in the pseudorange estimate, and in the final analysis, an improved accuracy in the estimate of the receiver position.

Naturally, the principles of embodiments of this invention being understood, the embodiments and the details thereof may be widely changed as compared with what has been described and illustrated herein merely by way of non-limiting example, without however departing from the scope of protection of the present invention as defined in the annexed claims.

From the foregoing it will be appreciated that, although specific embodiments of the invention have been described herein for purposes of illustration, various modifications may be made without deviating from the spirit and scope of the invention.

The invention claimed is:

1. A method for the acquisition and tracking of Binary Offset Carrier (BOC) (n,n) modulated codes, particularly for satellite positioning/navigation systems, comprising the steps of:
   acquiring at a receiver terminal a Binary Offset Carrier (BOC)(n,n) modulated pseudo-random noise code, from a remote transmitter;
   generating a local replica of said pseudo-random noise code at the receiver terminal; and
   calculating a correlation function of the Binary Offset Carrier (BOC)(n,n) modulated code received with a code $w_a$ locally generated according to the relationship $$w_a(\tau) = c(\tau_n) - a \cdot [prn(\tau_n + T_c/2) - prn(\tau_n - T_c/2)]$$

wherein $c(\tau)$ is a local replica of said Binary Offset Carrier (BOC) modulated pseudo-random noise code with delay $\tau_n$, $PRN(\tau)$ is a replica of said unmodulated pseudo-random noise code, and a is a predetermined non-zero weight coefficient,
   said correlation function being at the base of an acquisition test function, whereby a code acquisition is recognized for a value of said test function being higher than a predetermined threshold.

2. The method according to claim 1, wherein said correlation function is calculated by combining the separate correlation functions of the Binary Offset Carrier (BOC)(n,n) modulated code received with the components of code $w_a$.

3. The method according to claim 1, wherein said test function has the formula $$|x_{BOC}(n) - a \cdot (x_{BOC/PRN}(n+1) - x_{BOC/PRN}(n-1))|^2$$

wherein xBOC is the autocorrelation function of the Binary Offset Carrier (BOC) modulated pseudo-random noise code acquired and xBOC/PRN is the cross correlation function between said Binary Offset Carrier (BOC) modulated pseudo-random noise code acquired and the early and late replica of the unmodulated pseudo-random noise code, respectively.

4. The method according to claim 1, wherein said test function is calculated in a research domain for a plurality of preset code delay values and Doppler shift.

5. A system for acquisition and tracking Binary Offset Carrier (BOC)(n,n) modulated codes, comprising:
   means for acquiring a Binary Offset Carrier (BOC)(n,n) modulated pseudo-random noise code from a remote transmitter;
   means for generating a replica locale of said pseudo-random noise code, and
   processing means arranged for calculating an acquisition test function based on the Binary Offset Carrier (BOC)(n,n) modulated code received and a local replica relative to said signal,
   wherein said processing means are arranged for calculating a correlation function of the Binary Offset Carrier (BOC)(n,n) modulated pseudo-random noise code received with a $w_a$ code locally generated according to the relationship $$w_a(\tau) = c(\tau_n) - a \cdot [prn(\tau_n - T_c/2) - prn(\tau_n - T_c/2)]$$

wherein $c(\tau)$ is a local replica of said Binary Offset Carrier (BOC) modulated pseudo-random noise code with delay $\tau_n$, $PRN(\tau)$ is a replica of said unmodulated pseudo-random noise code, and a is a predetermined non-zero weight coefficient.

6. The system according to claim 5, wherein said processing means are arranged for calculating a plurality of separate correlation functions of the Binary Offset Carrier (BOC)(n,n) modulated code received with the components of the code $w_a$ and for subsequently combining the correlation results in compliance with the expression of $w_a$.

7. The system according to claim 5, wherein said processing means are arranged for calculating an acquisition test function in the formula $$|x_{BOC}(n)-a \cdot (x_{BOC/PRN}(n+1)-x_{BOC/PRN}(n-1))|^2$$

wherein $x_{BOC}$ is the autocorrelation function of the Binary Offset Carrier (BOC) modulated pseudo-random noise code acquired and $x_{BOC/PRN}$ is the cross correlation function between said acquired Binary Offset Carrier (BOC) modulated pseudo-random noise code and the early and late local replica of the unmodulated pseudo-random noise code, respectively, and suitable to recognize a code acquisition for a value of said test function being higher than a predetermined threshold.

8. The system according to claim 7, wherein said test function is calculated in a research domain for a plurality of preset code delay and Doppler shift values.

9. A receiver of a satellite positioning/navigation system, comprising a system for the acquisition and tracking of codes as defined in claim 5.

10. A method for the acquisition and tracking of BOC(m,n) modulated codes, m/n equal to an integer, particularly for satellite positioning/navigation systems, comprising the steps of:
acquiring at a receiver terminal a Binary Offset Carrier (BOC)(m,n) modulated pseudo-random noise code, from a remote transmitter;
generating a local replica of said pseudo-random noise code at the receiver terminal; and
calculating a correlation function of the Binary Offset Carrier (BOC)(m,n) modulated code received with a code $w_a$ locally generated according to the relationship $$w_a(\tau)=c(\tau_n)-a \cdot [prn(\tau+nT_c/2m)-prn(\tau_n-nT_c/2m)]$$

wherein $c(\tau)$ is a local replica of said Binary Offset Carrier (BOC) modulated pseudo-random noise code with delay $\tau_n$, $PRN(\tau)$ is a replica of said unmodulated pseudo-random noise code, and a is a predetermined non-zero weight coefficient,
said correlation function being at the base of an acquisition test function, whereby a code acquisition is recognized for a value of said test function being higher than a predetermined threshold.

11. A system for acquisition and tracking Binary Offset Carrier (BOC)(m,n) modulated codes, comprising:
means for acquiring a Binary Offset Carrier (BOC)(m,n) modulated pseudo-random noise code from a remote transmitter;
means for generating a replica locale of said pseudo-random noise code, and
processing means arranged for calculating an acquisition test function based on the Binary Offset Carrier (BOC)(m,n) modulated code received and a local replica relative to said signal,
wherein said processing means are arranged for calculating a correlation function of the Binary Offset Carrier (BOC)(m,n) modulated pseudo-random noise code received with a $w_a$ code locally generated according to the relationship $$w_a(\tau)=c(\tau_n)-a \cdot [prn(\tau_n+nT_c/2m)-prn(\tau_n-nT_c/2m)]$$

wherein $c(\tau)$ is a local replica of said Binary Offset Carrier (BOC) modulated pseudo-random noise code with delay $\tau_n$, $PRN(\tau)$ is a replica of said unmodulated pseudo-random noise code, and a is a predetermined non-zero weight coefficient.

12. A receiver of a satellite positioning/navigation system, comprising a system for the acquisition and tracking of codes as defined in claim 11.

13. A method for the acquisition and tracking of Binary Offset Carrier (BOC)(m,n) modulated codes, m/n equal to an integer, particularly for satellite positioning/navigation systems, comprising the steps of:
acquiring at a receiver terminal a Binary Offset Carrier (BOC)(m,n) modulated pseudo-random noise code, from a remote transmitter;
generating a local replica of said pseudo-random noise code at the receiver terminal; and
calculating a correlation function of the Binary Offset Carrier (BOC)(m,n) modulated code received with a code $w_a$ locally generated according to the relationship $$w_a(\tau)=c(\tau_n)-a \cdot [prn(\tau_n+nT_c/4m)+prn(\tau_n-nT_c/4m)]$$

wherein $c(\tau)$ is a local replica of said Binary Offset Carrier (BOC) modulated pseudo-random noise code with delay $\tau_n$, $PRN(\tau)$ is a replica of said unmodulated pseudo-random noise code, and a is a predetermined non-zero weight coefficient,
said correlation function being at the base of an acquisition test function, whereby a code acquisition is recognized for a value of said test function being higher than a predetermined threshold.

14. A system for acquisition and tracking Binary Offset Carrier (BOC)(m,n) modulated codes, comprising:
means for acquiring a Binary Offset Carrier (BOC)(m,n) modulated pseudo-random noise code from a remote transmitter;
means for generating a replica locale of said pseudo-random noise code, and
processing means arranged for calculating an acquisition test function based on the Binary Offset Carrier (BOC)(m,n) modulated code received and a local replica relative to said signal,
wherein said processing means are arranged for calculating a correlation function of the Binary Offset Carrier (BOC)(m,n) modulated pseudo-random noise code received with a $w_a$ code locally generated according to the relationship $$w_a(\tau)=c(\tau_n)-a \cdot [prn(\tau_n+nT_c/4m)+prn(\tau_n-nT_c/4m)]$$

wherein $c(\tau)$ is a local replica of said Binary Offset Carrier (BOC) modulated pseudo-random noise code with delay $\tau_n$, $PRN(\tau)$ is a replica of said unmodulated pseudo-random noise code, and a is a predetermined non-zero weight coefficient.

15. A receiver of a satellite positioning/navigation system, comprising a system for the acquisition and tracking of codes as defined in claim 14.

16. A method for the acquisition and tracking of BOC(m,n) modulated codes, m/n equal to an integer, particularly for satellite positioning/navigation systems, comprising the steps of:

acquiring at a receiver terminal a Binary Offset Carrier (BOC)(m,n) modulated pseudo-random noise code, from a remote transmitter;

generating a local replica of said pseudo-random noise code at the receiver terminal; and calculating a correlation function of the Binary Offset Carrier (BOC)(m,n) modulated code received with a code $w_a$ locally generated according to the relationship $$w_a(\tau)=c(\tau_n)-a\cdot[prn(\tau_n+3nT_c/4m)+prn(\tau_n,3nT_c/4m)]$$

wherein $c(\tau)$ is a local replica of said Binary Offset Carrier (BOC) modulated pseudo-random noise code with delay $\tau_n$, $PRN(\tau)$ is a replica of said unmodulated pseudo-random noise code, and a is a predetermined non-zero weight coefficient, said correlation function being at the base of an acquisition test function, whereby a code acquisition is recognized for a value of said test function being higher than a predetermined threshold.

17. A system for acquisition and tracking Binary Offset Carrier (BOC)(m,n) modulated codes, comprising:

means for acquiring a Binary Offset Carrier (BOC)(m,n) modulated pseudo-random noise code from a remote transmitter;

means for generating a replica locale of said pseudo-random noise code, and processing means arranged for calculating an acquisition test function based on the Binary Offset Carrier (BOC)(m,n) modulated code received and a local replica relative to said signal, wherein said processing means are arranged for calculating a correlation function of the Binary Offset Carrier (BOC)(m,n) modulated pseudo-random noise code received with a $w_a$ code locally generated according to the relationship $$w_a(\tau)=c(\tau_n)-a\cdot[prn(\tau_n+3nT_c/4m)+prn(\tau_n-3nT_c/4m)]$$

wherein $c(\tau)$ is a local replica of said Binary Offset Carrier (BOC) modulated pseudo-random noise code with delay $\tau_n$, $PRN(\tau)$ is a replica of said unmodulated pseudo-random noise code, and a is a predetermined non-zero weight coefficient.

18. A receiver of a satellite positioning/navigation system, comprising a system for the acquisition and tracking of codes as defined in claim 17.

19. A method for the acquisition and tracking of Binary Offset Carrier (BOC)(m,n) modulated codes, m/n equal to an integer, particularly for satellite positioning/navigation systems, comprising the steps of:

acquiring at a receiver terminal a Binary Offset Carrier (BOC)(m,n) modulated pseudo-random noise code, from a remote transmitter;

generating a local replica of said pseudo-random noise code at the receiver terminal; and calculating a correlation function of the Binary Offset Carrier (BOC)(m,n) modulated code received with a code w locally generated according to the relationship $$w(\tau)=[prn(\tau_n+nT_c/4m)+prn(\tau_n,nT_c/4m)]$$

wherein $PRN(\tau)$ is a replica of said unmodulated pseudo-random noise code, said correlation function being at the base of an acquisition test function, whereby a code acquisition is recognized for a value of said test function being higher than a predetermined threshold.

20. A system for acquisition and tracking Binary Offset Carrier (BOC)(m,n) modulated codes, comprising:

means for acquiring a Binary Offset Carrier (BOC)(m,n) modulated pseudo-random noise code from a remote transmitter;

means for generating a replica locale of said pseudo-random noise code, and processing means arranged for calculating an acquisition test function based on the Binary Offset Carrier (BOC)(m,n) modulated code received and a local replica relative to said signal, wherein said processing means are arranged for calculating a correlation function of the BOC(m,n) modulated pseudo-random noise code received with a w code locally generated according to the relationship $$w(\tau)=[prn(\tau_n+nT_c/4m)+prn(\tau_n-nT_c/4m)]$$

wherein $PRN(\tau)$ is a replica of said unmodulated pseudo-random noise code.

21. A receiver of a satellite positioning/navigation system, comprising a system for the acquisition and tracking of codes as defined in claim 20.

22. A method for the acquisition and tracking of Binary Offset Carrier (BOC)(m,n) modulated codes, m/n equal to an integer, particularly for satellite positioning/navigation systems, comprising the steps of:

acquiring at a receiver terminal a Binary Offset Carrier (BOC)(m,n) modulated pseudo-random noise code, from a remote transmitter;

generating a local replica of said pseudo-random noise code at the receiver terminal; and calculating a correlation function of the Binary Offset Carrier (BOC)(m,n) modulated code received with a code w locally generated according to the relationship $$w(\tau)=[prn(\tau_n+nT_c/2m)-prn(\tau_n-nT_c/2m)]$$

wherein $PRN(\tau)$ is a replica of said unmodulated pseudo-random noise code, said correlation function being at the base of an acquisition test function, whereby a code acquisition is recognized for a value of said test function being higher than a predetermined threshold.

23. A system for acquisition and tracking Binary Offset Carrier (BOC)(m,n) modulated codes, comprising:

means for acquiring a Binary Offset Carrier (BOC)(m,n) modulated pseudo-random noise code from a remote transmitter;

means for generating a replica locale of said pseudo-random noise code, and processing means arranged for calculating an acquisition test function based on the Binary Offset Carrier (BOC)(m,n) modulated code received and a local replica relative to said signal, wherein said processing means are arranged for calculating a correlation function of the Binary Offset Carrier (BOC)(m,n) modulated pseudo-random noise code received with a w code locally generated according to the relationship $$w(\tau)=[prn(\tau_n+nT_c/2m)-prn(\tau_n-nT_c/2m)]$$

wherein $PRN(\tau)$ is a replica of said unmodulated pseudo-random noise code.

24. A receiver of a satellite positioning/navigation system, comprising a system for the acquisition and tracking of codes as defined in claim 23.

\* \* \* \* \*

UNITED STATES PATENT AND TRADEMARK OFFICE
CERTIFICATE OF CORRECTION

| | | |
|---|---|---|
| PATENT NO. | : 7,949,038 B2 | |
| APPLICATION NO. | : 12/001992 | |
| DATED | : May 24, 2011 | |
| INVENTOR(S) | : Giuseppe Avellone et al. | |

It is certified that error appears in the above-identified patent and that said Letters Patent is hereby corrected as shown below:

- In Claim 19, Column 19, Line 59 of the patent, that portion of the formula reading "$+prn\ (\tau_n n T_c/4m)]$" should read -- $+ prn\ (\tau_n - nT_c/4m)]$ --.

Signed and Sealed this
Fourth Day of October, 2011

David J. Kappos
*Director of the United States Patent and Trademark Office*